(12) United States Patent
Hara et al.

(10) Patent No.: US 8,896,793 B2
(45) Date of Patent: Nov. 25, 2014

(54) ELECTRO-OPTICAL DEVICE AND ELECTRONIC EQUIPMENT

(75) Inventors: Hiroyuki Hara, Chino (JP); Tomoki Yokota, Chino (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 13/269,689

(22) Filed: Oct. 10, 2011

(65) Prior Publication Data
US 2012/0099067 A1   Apr. 26, 2012

(30) Foreign Application Priority Data

Oct. 25, 2010   (JP) ................................. 2010-238320
May 23, 2011   (JP) ................................. 2011-114701

(51) Int. Cl.
| | | |
|---|---|---|
| G02F 1/1343 | (2006.01) | |
| G02F 1/1345 | (2006.01) | |
| G02F 1/1362 | (2006.01) | |
| H04N 9/31 | (2006.01) | |
| G02F 1/1333 | (2006.01) | |

(52) U.S. Cl.
CPC .... *G02F 1/136277* (2013.01); *G02F 1/136286* (2013.01); *H04N 9/3105* (2013.01); *G02F 1/13454* (2013.01); *G02F 1/136209* (2013.01); *G02F 1/136213* (2013.01); *G02F 1/136227* (2013.01); *G02F 2001/133388* (2013.01); *G02F 2001/13456* (2013.01); *G02F 2001/13629* (2013.01); *G02F 2201/48* (2013.01)
USPC ............................. 349/139; 349/143; 349/149

(58) Field of Classification Search
CPC ..................... G02F 1/136286; G02F 1/136213; G02F 1/136227; G02F 2001/133388; G02F 2001/13456; G02F 2001/13629; G02F 2001/136218
USPC ............ 349/139, 143, 149–152; 345/90, 104
See application file for complete search history.

(56) References Cited

U.S. PATENT DOCUMENTS

| | | | |
|---|---|---|---|
| 6,373,544 B1 | 4/2002 | Hirabayashi | |
| 6,795,144 B1 * | 9/2004 | Okuda et al. | 349/113 |
| 7,253,795 B2 | 8/2007 | Tsunekawa et al. | |
| 2004/0135940 A1 * | 7/2004 | Tsunekawa et al. | 349/110 |
| 2007/0146598 A1 * | 6/2007 | Yokokawa et al. | 349/123 |
| 2008/0284719 A1 * | 11/2008 | Yoshida | 345/102 |
| 2009/0262267 A1 * | 10/2009 | Kameyama et al. | 349/5 |
| 2010/0079694 A1 * | 4/2010 | Yoshida et al. | 349/40 |

FOREIGN PATENT DOCUMENTS

| | | |
|---|---|---|
| JP | 3767154 B | 4/1920 |
| JP | 2004-170909 | 6/2004 |
| JP | 2006-267937 A | 10/2006 |
| JP | 2006267937 A * | 10/2006 |

OTHER PUBLICATIONS

European Search Report, Jan. 24, 2012, issued in related Patent Application No. EP-11184913.

* cited by examiner

*Primary Examiner* — Michael Caley
*Assistant Examiner* — Jia Pan
(74) *Attorney, Agent, or Firm* — ALG Intellectual Property, LLC

(57) ABSTRACT

In a display region, pixel electrodes are arranged with a predetermined pitch in a matrix. Dummy pixel electrodes provided in a dummy display region surrounding the display region are formed from the same layer as the pixel electrodes, and are arranged in an island shape so as to have the same size and pitch as the pixel electrodes. The dummy pixel electrodes are connected to each other via a wire positioned under the pixel electrodes.

15 Claims, 26 Drawing Sheets

<K REGION (PIXEL ELECTRODE, DUMMY PIXEL ELECTRODE, CONDUCTIVE PATTERN)>

<L REGION (PIXEL ELECTRODE, DUMMY PIXEL ELECTRODE, CONDUCTIVE PATTERN)>

<N REGION (PIXEL ELECTRODE, DUMMY PIXEL ELECTRODE, CONDUCTIVE PATTERN)>

<K REGION (PIXEL ELECTRODE, DUMMY PIXEL ELECTRODE, CONDUCTIVE PATTERN)>

<K REGION (PIXEL ELECTRODE, DUMMY PIXEL ELECTRODE, CONDUCTIVE PATTERN)>

<K REGION (PIXEL ELECTRODE, DUMMY PIXEL ELECTRODE, CONDUCTIVE PATTERN)>

ELECTRO-OPTICAL DEVICE AND ELECTRONIC EQUIPMENT

BACKGROUND

1. Technical Field

The present invention relates to an electro-optical device, and electronic equipment using the electro-optical device.

2. Related Art

An electro-optical device, for example, a liquid crystal panel has a configuration in which a pair of an element substrate and an opposite substrate is bonded together with a constant gap, and liquid crystal is sealed in the gap. Pixel electrodes are arranged in a matrix for respective pixels on a surface of the element substrate facing the opposite substrate. On the other hand, a common electrode is provided on a surface of the opposite substrate facing the element substrate, so as to face the overall pixel electrodes.

Among liquid crystal panels, in a liquid crystal panel having a display region of one inch or less diagonally, for example, applied to a light valve of a projector, a step difference occurring due to presence or absence of the pixel electrodes causes disarray in the liquid crystal alignment or optical scattering, thereby reducing a contrast ratio. In order to remove the step difference, a technique has been proposed in which a conductive pattern, which does not contribute to displaying, formed from the same layer as the pixel electrodes is provided in a region outside the display region where the pixel electrodes are arranged at almost the same density as the pixel electrodes, and thus the flatness of the inside and outside of the display region is little different (see JP-A-2006-267937 (refer to FIG. 4)).

However, the conductive pattern is a pattern formed by connecting to each other electrodes having the same size as the pixel electrodes, which are longitudinally and transversely adjacent to each other. For this reason, there is a problem in that since the area of the connection parts is increased, the conductive pattern provided in the region outside the display region does not have the same density as the pixel electrodes, and, as a result, a difference in the flatness occurs.

SUMMARY

An advantage of some aspects of the invention is to provide a technique capable of further decreasing a difference in the flatness between a display region and a region outside the display region.

According to an aspect of the invention, there is provided an electro-optical device including an element substrate; and an opposite substrate disposed to face the element substrate and having a common electrode on a side facing the element substrate, wherein the element substrate includes a plurality of pixel electrodes formed at a side facing the opposite substrate and arranged with a predetermined pitch for each pixel; a driving circuit located outside the plurality of pixel electrodes in the plan view and driving the pixels; a plurality of dummy pixel electrodes provided so as to surround the plurality of pixel electrodes between the driving circuit and the plurality of pixel electrodes, formed from the same layer as the plurality of pixel electrodes, and arranged in an island shape so as to have substantially the same size and pitch as the plurality of pixel electrodes in the plan view; and a wire disposed on a layer different from the plurality of pixel electrodes and electrically connecting the dummy pixel electrodes, which are adjacent to each other in at least one direction among the plurality of dummy pixel electrodes, to each other. With this configuration, since the pixel electrode and the dummy pixel electrode have substantially the same size and pitch, a difference in the flatness can be reduced as compared with the related art. Further, it is possible to commonly apply a voltage independent from that applied to the pixel electrodes, to the dummy pixel electrodes via the wire.

In the configuration, the element substrate may include a plurality of scan lines, and a plurality of data lines intersecting the plurality of scan lines in the plan view; and a shield electrode provided between the data line and the pixel electrode in the cross-sectional view, formed to cover the data line in the plan view, and has a predetermined voltage applied to it. Here, the pixel electrode may be provided at each of intersections of the plurality of scan lines and the plurality of data lines in the plan view. In addition, the wire may be formed from the same layer as the shield electrode and has a predetermined voltage applied to it. According to the configuration, the same layer as the shield electrode which suppresses capacitance coupling between the pixel electrode and the data line may be used as a wire. Further, in the configuration, it is preferable that the common electrode preferably has predetermined common voltage applied to it, and the predetermined voltage be the common voltage. Thereby, when an electro-optical material such as, for example, liquid crystal is sandwiched by the dummy pixel electrode and the common electrode, a voltage applied to the corresponding electro-optical material can become zero.

In the configuration, the element substrate may include a plurality of scan lines; and a plurality of data lines intersecting the plurality of scan lines in the plan view. Here, the pixel electrode may be provided at each of the intersections of the plurality of scan lines and the plurality of data lines in the plan view. In addition, the driving circuit may include two scan line driving circuits respectively driving each of the plurality of scan lines from both end sides of the plurality of scan lines; and a data line driving circuit driving each of the plurality of data lines from one end side of the plurality of data lines. In the configuration, the wire may be a first wire formed from an electrode layer different from the data line. Here, the dummy pixel electrodes located between the data line driving circuit and the plurality of pixel electrodes among the plurality of dummy pixel electrodes is preferably connected to each other via the first wire. With this configuration, it is possible to connect the dummy pixel electrodes to each other using the first wire formed from an electrode layer different from the data line. As the wire, a layer formed by patterning a relay electrode layer for connection to a source or drain region of a semiconductor layer, a gate electrode layer formed from the same layer as the scan line, or the like, may be used. In addition, the wire may be a second wire formed from the same electrode layer as the data line. Here, the dummy pixel electrodes located between the scan line driving circuit and the plurality of pixel electrodes among the plurality of dummy pixel electrodes are preferably connected to each other via the second wire. With this configuration, it is possible to connect the dummy pixel electrodes to each other using the second wire formed from the same layer as the data line. As such, if the existing conductive layer is used as a wire, it is possible to prevent a manufacturing process from being complicated.

In the configuration, a voltage higher than the common voltage by a predetermined value and a voltage lower than the common voltage by the predetermined value may be alternately applied to the dummy pixel electrode at a predetermined period. With this configuration, when the liquid crystal is sandwiched by the dummy pixel electrode and the common electrode, a voltage applied to the corresponding liquid crystal can become zero, and the reflectance or transmittance in the dummy display region can be minimized even if the reflectance or the transmittance does not become the minimum when an effective voltage value applied to the liquid crystal is zero. Of course, there may not be a voltage at which the reflectance or the transmittance is the minimum. For example, the common voltage may be applied. With this configuration, for example, a voltage applied to the liquid crystal sandwiched by the dummy pixel electrode and the common electrode can become zero.

In the configuration, an insulating material may be buried in a gap between the pixel electrodes and a gap between the dummy pixel electrodes in the plan view. With this configuration, a step difference occurring from the display region to the dummy display region can be much reduced.

In addition, in the configuration, the electro-optical device may further include a conductive pattern provided at a position surrounding the dummy pixel electrode in the plan view, formed from the same layer as the pixel electrode, and not connected to the dummy pixel electrode. By this configuration, it is possible to reduce a step difference occurring from the dummy display region to the external region.

According to another aspect of the invention, there is provided an electro-optical device including an element substrate; and an opposite substrate disposed to face the element substrate and having a common electrode on a side facing the element substrate, wherein the element substrate includes a plurality of pixel electrodes formed at a side facing the opposite substrate and arranged with a predetermined pitch for each pixel; a driving circuit located outside the plurality of pixel electrodes in the plan view and driving the pixels; a plurality of dummy pixel electrodes provided so as to surround the plurality of pixel electrodes between the driving circuit and the plurality of pixel electrodes, formed from the same layer as the plurality of pixel electrodes, and arranged in an island shape so as to have substantially the same density as the plurality of pixel electrodes in the plan view; and a wire disposed on a layer different from the plurality of pixel electrodes and electrically connecting the dummy pixel electrodes, which are adjacent to each other in at least one direction among the plurality of dummy pixel electrodes, to each other. With this configuration, since the pixel electrode and the dummy pixel electrode have substantially the same density, a difference in the flatness can be reduced as compared with the related art. Further, it is possible to commonly apply a voltage independent from that applied to the pixel electrodes, to the dummy pixel electrodes via the wire.

Further, the invention is not limited to the electro-optical device, but is applicable to electronic equipment including the electro-optical device. As the electronic equipment, there is a projector which enlarges and projects a light modulation image by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment will be described.

A reflective liquid crystal panel according to the first embodiment is used as a light valve of a projector described later. The liquid crystal panel according to the first embodiment is mainly characterized in a dummy pixel electrode of a dummy display region located outside a display region. However, it is necessary to describe what relationship a layer forming the dummy pixel electrode or a wire to the dummy pixel electrode has with a conductive layer of the display region.

Therefore, first, an outline of a structure of a liquid crystal panel 100 will be described.

In addition, in the following drawings, for better understanding of each layer, each member, each region, and the like, the scales thereof may be different from each other.

Figure 1A:
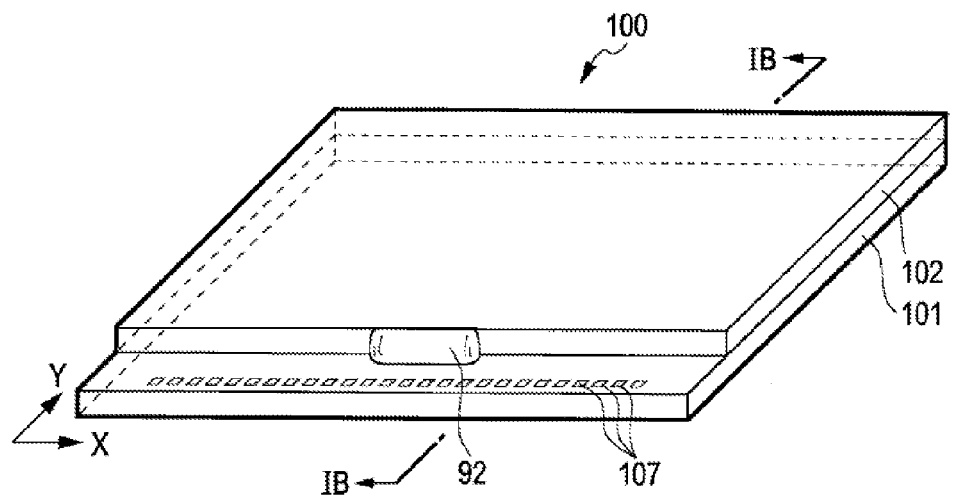
FIGS. 1A and 1B are diagrams illustrating a configuration of a liquid crystal panel according to a first embodiment.
Figure 1B:
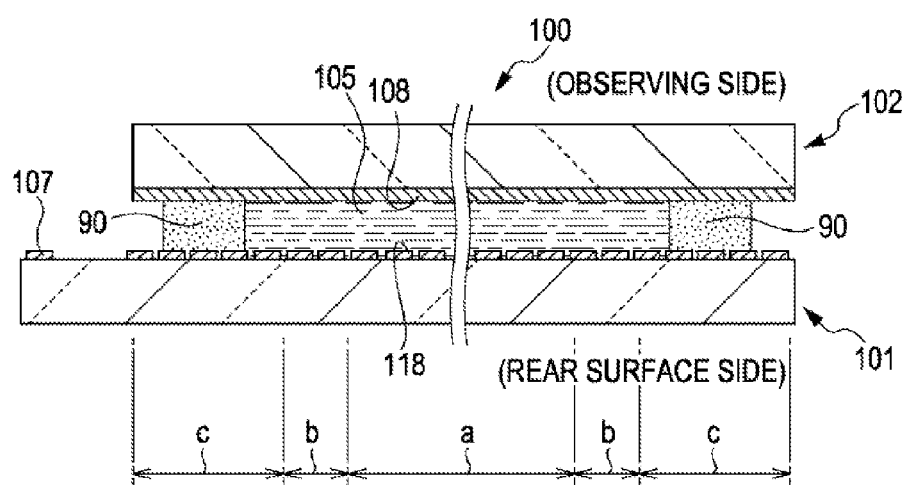

FIG. 1A is a perspective view illustrating a structure of the liquid crystal panel 100 according to the first embodiment, and FIG. 1B is a cross-sectional view taken along the line IB-IB in FIG. 1A.

As shown in the figures, the liquid crystal panel 100 has a structure in which an element substrate 101 provided with pixel electrodes 118 and an opposite substrate 102 provided with a common electrode 108 maintain a constant gap by a sealing material 90 including spacers (not shown), and are bonded together such that the surfaces provided with the electrodes face each other, and, for example, a VA (Vertical Alignment) type liquid crystal 105 is sealed in the gap.

As the element substrate 101 and the opposite substrate 102, substrates having optical transparency such as glass or quartz are respectively used. The element substrate 101 has a size larger than the opposite substrate 102 in the Y direction in FIG. 1A, however, since the inner parts thereof are aligned, one side of the front part of the element substrate 101 hangs over the opposite substrate 102. A plurality of terminals 107 is provided in the hanging-over region in the X direction. In addition, the plurality of terminals 107 are connected to an FPC (Flexible Printed Circuit) board, and are supplied with various kinds of signals, various kinds of voltages, image signals from an external higher-rank device.

Further, in the embodiment, a substrate having no optical transparency, for example, a silicon substrate may be used as the element substrate 101, and the liquid crystal panel may be configured as a so-called LCOS (Liquid Crystal on Silicon) type.

In the element substrate 101, the pixel electrodes 118 formed on the surface facing the opposite substrate 102 are obtained by patterning a reflective metal layer such as aluminum, which will be described later in detail. In the opposite substrate 102, the common electrode 108 provided on the surface facing the element substrate 101 is a transparent conductive layer such as ITO (Indium Tin Oxide).

In addition, the sealing material 90, as described later, is formed in a frame shape along the inner edge of the opposite substrate 102, and a portion thereof is in practice opened in order to seal the liquid crystal 105. For this reason, after the liquid crystal 105 is sealed, the opening portion is sealed by sealing member 92. The facing surface of the element substrate 101 and the facing surface of the opposite substrate 102 are respectively provided with alignment layers for aligning the liquid crystal molecules in the normal direction of the substrate surface in a state where a voltage is not applied, which are not shown in FIG. 1B.

Figure 8:
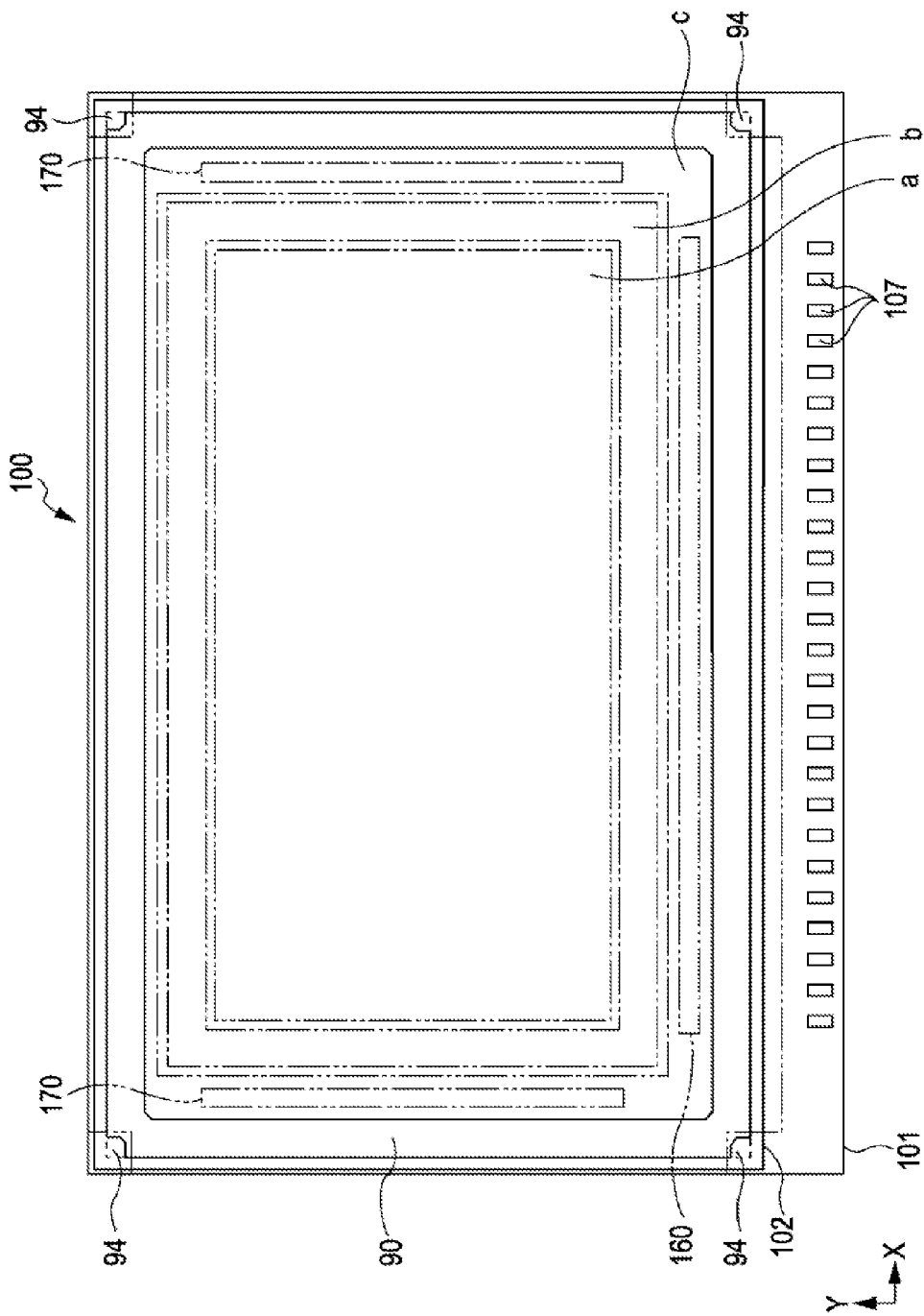
FIG. 8 is a diagram illustrating respective regions of an element substrate in the liquid crystal panel.
Figure 9:
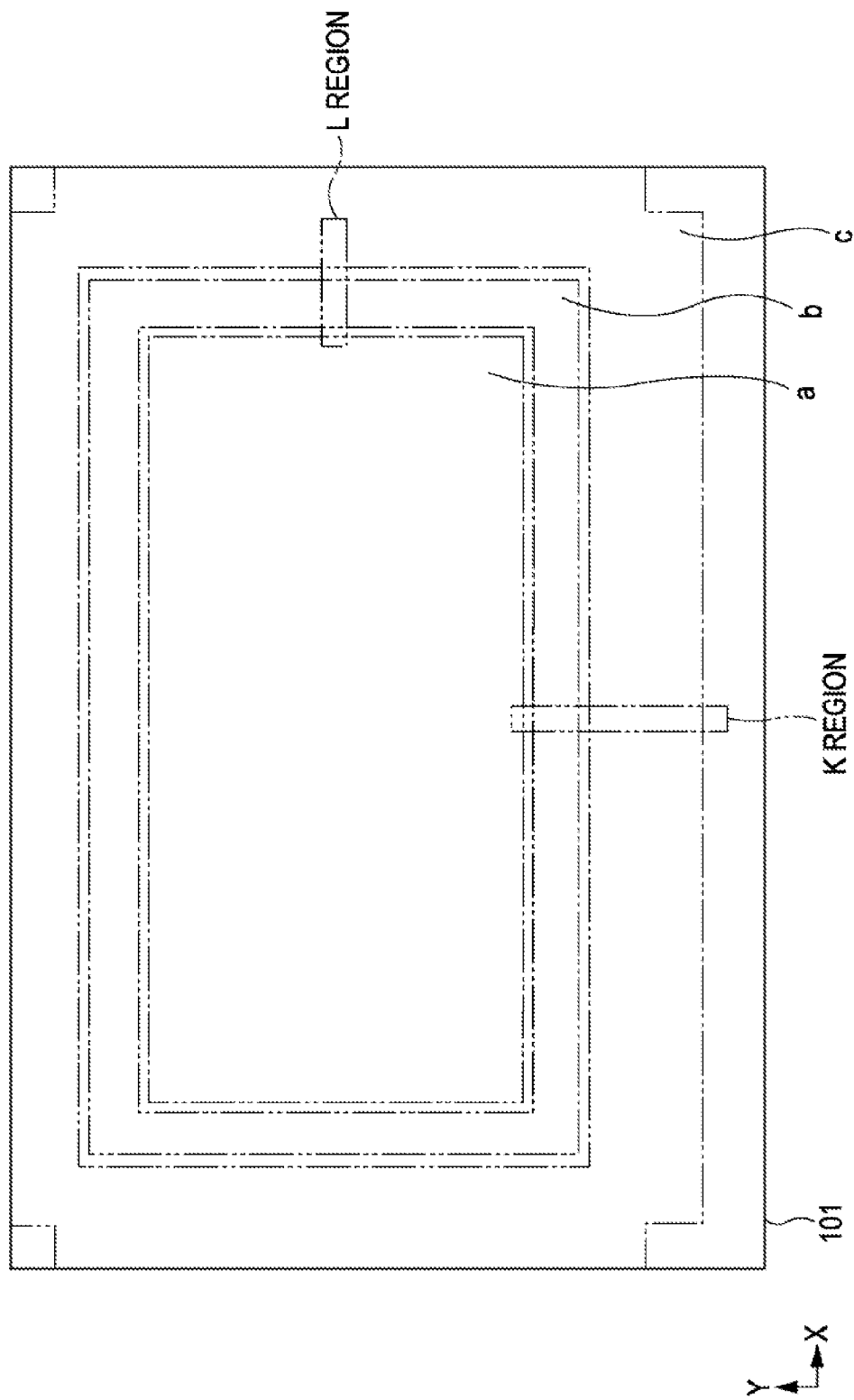
FIG. 9 is a diagram illustrating the respective regions to be partitioned.

Here, the regions a, b and c of the element substrate 101 shown in FIG. 1B are described with reference to FIGS. 8 and 9. FIG. 8 is a plan view illustrating the element substrate 101 when seen from the opposite substrate 102 side, that is, the observing side, and FIG. 9 is a diagram illustrating extraction of the regions a, b and c from FIG. 8. In addition, the opening portion of the sealing material 90 and the sealing member 92 shown in FIG. 1A are not shown in FIG. 8.

In FIG. 8 or 9, a indicates a display region where the pixel electrodes 118 contributing to displaying are arranged in a matrix. In addition, b indicates a dummy display region which is located outside the display region a so as to surround the display region a, and is located between the display region a and a peripheral circuit region in which driving circuits including a data line driving circuit 160 and scan line driving circuits 170 are provided. Further, c indicates an external region which is located between outside of the dummy display region b and the edge portion of the element substrate 101 and excludes conduction points 94 and the part where the terminals 107 are arranged. In other words, the dummy display region b is a region located between the display region a and the external region c.

Next, an electric configuration of the liquid crystal panel 100 will be described with reference to FIG. 2. Here, FIG. 2 shows a positional relationship when viewed from the lower side in FIG. 1A, that is, when viewed from the rear surface side in plan, contrary to FIGS. 8 and 9.

As described above, the liquid crystal panel 100 is provided with the element substrate 101 and the opposite substrate 102 bonded together with a constant gap, and the liquid crystal 105 is sandwiched in the gap. The surface of the element substrate 101 facing the opposite substrate 102 is provided with a plurality of scan lines 112 of m rows in the X direction in the figure, and a plurality of data lines 114 of n columns in the Y direction, and the respective scan lines 112 are electrically insulated from each other.

In the display region a, a set of an n-channel type TFT 116 which is an example of a switching element and the reflective pixel electrode 118 are provided at each of the intersections of the scan lines 112 of m rows and the data lines 114 of n columns. The TFTs 116 have gate electrodes connected to the scan lines 112, source electrodes connected to the data lines 114, and drain electrodes connected to the pixel electrodes 118. Therefore, in the embodiment, the pixel electrodes 118 are arranged in an m X n matrix in the display region a.

Figure 2:
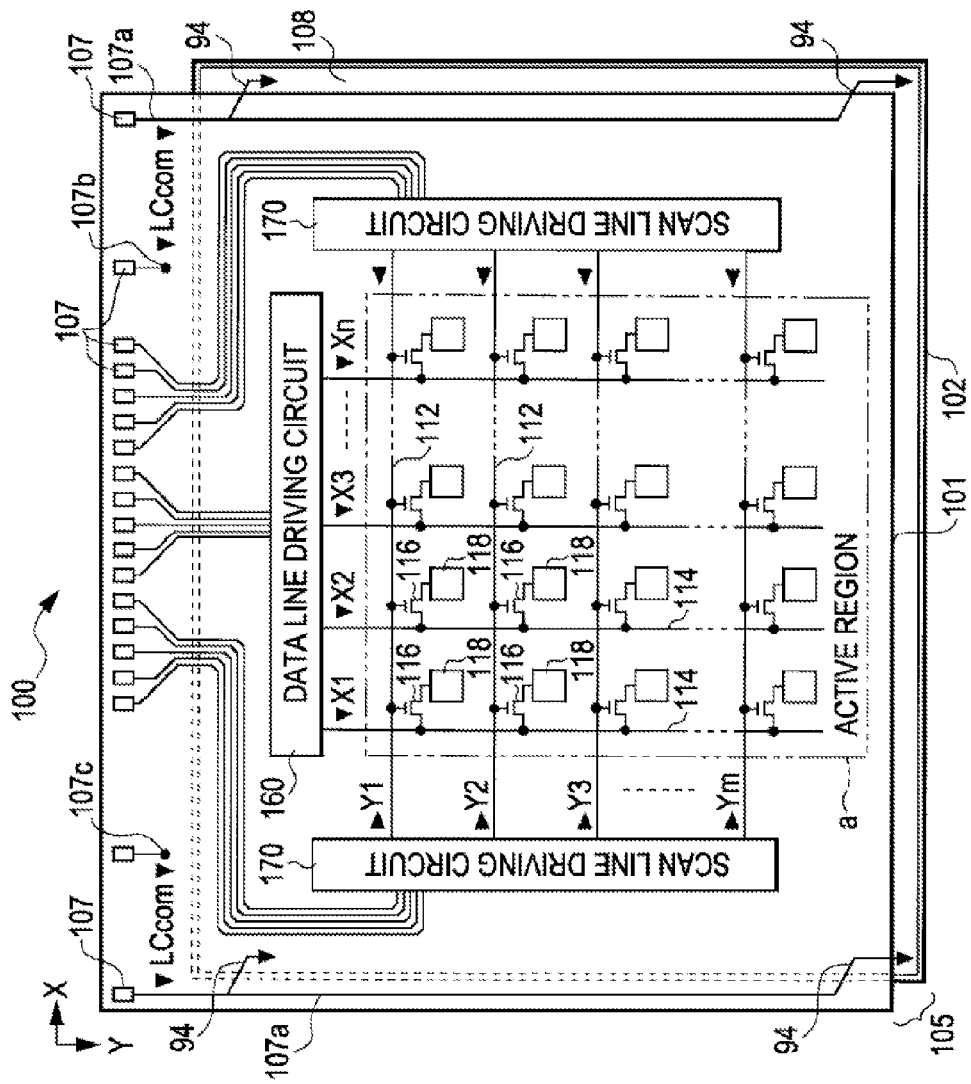
FIG. 2 is a diagram illustrating a circuit configuration in the liquid crystal panel.

In FIG. 2, since the facing surface of the element substrate 101 viewed from the rear surface side corresponds to the inside of the space, the scan lines 112, the data lines 114, the TFTs 116, the pixel electrodes 118, and the like are not denoted with dotted lines, as they are hard to see, and are thus each denoted with solid lines. In addition, in the embodiment, in order to differentiate the data lines 114 from each other, they may be sequentially indicated by first, second, third, . . . , (n−1)-th, and n-th columns from the left in FIG. 2. In a similar manner, in order to differentiate the scan lines 112 from each other, they may be sequentially indicated by first, second, third, . . . , (m−1)-th, m-th rows from the top in FIG. 2.

The data line driving circuit 160 drives the data lines 114 in the first, second, third, . . . , and n-th columns from at one end side of the data lines 114. Specifically, the data line driving circuit 160 distributes and holds image signals supplied via the terminals 107 into the data lines 114 in the first, second, third, . . . , and n-th columns using various kinds of control signals supplied via the same terminals 107, and supplies the image signals as data signals X1, X2, X3, . . . , and Xn. In addition, the data line driving circuit 160, as shown in FIG. 8, is provided in the one side region in which the plurality of terminals 107 is provided in the external region c.

The two scan line driving circuits 170 drive the scan lines 112 in the first, second, third, . . . , and m-th rows from both of one end and the other end thereof. Specifically, the scan line driving circuits 170 respectively generates scan signals Y1, Y2, Y3, . . . , and Ym using various kinds of control signals supplied via the terminals 107, and supplies the generated scan signals from both sides of the scan lines 112 in the first, second, third, . . . , and m-th rows. In addition, the scan line driving circuits 170, as shown in FIG. 8, are respectively provided in regions of two sides adjacent to the region in which the data line driving circuit 160 is formed in the external region c.

On the other hand, the transparent common electrode 108 is provided on the entire surface of the opposite substrate 102 facing the element substrate 101. The common electrode 108 has applied to it a voltage LCcom sequentially via the terminals 107, the wires 107a, and the conduction points 94 with the opposite substrate 102 on the element substrate 101. In addition, the conduction points 94 are respectively positioned at four corners out of range of the sealing material 90 which is formed at the edge of the inner perimeter of the substrate when viewed in plan as shown in FIG. 8, and are electrically connected to the common electrode 108 by a conduction material such as silver paste.

Figure 3:
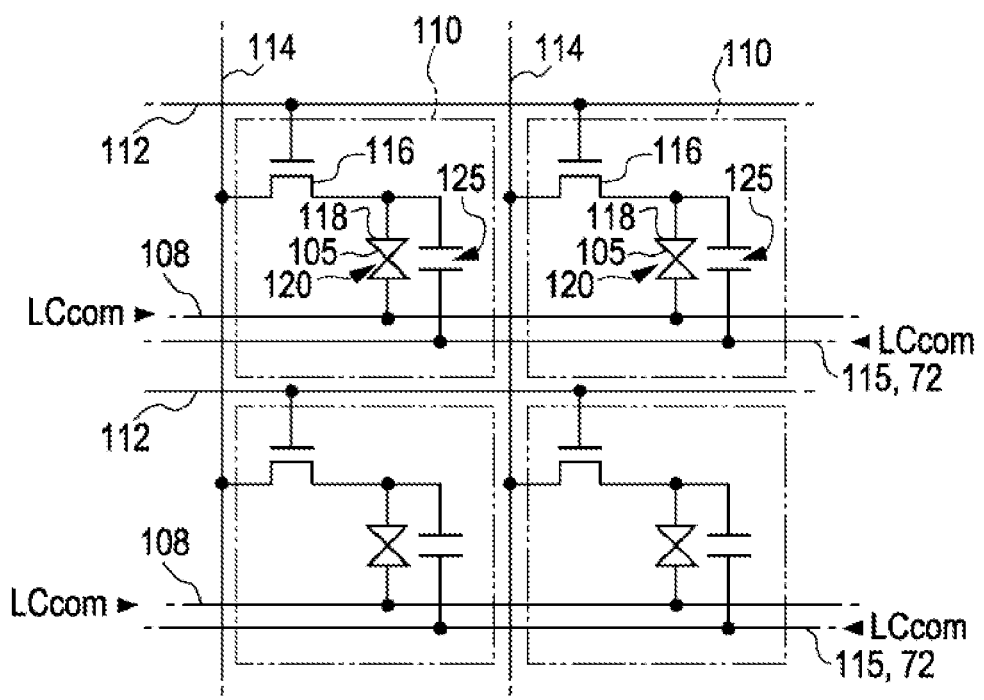
FIG. 3 is a diagram illustrating an equivalent circuit of a pixel in the liquid crystal panel.

FIG. 3 is a diagram illustrating an equivalent circuit of the pixel 110 in the display region a, where a liquid crystal element 120 is arranged in which the liquid crystal 105 is sandwiched by the pixel electrodes 118 and the common electrode 108 at each of the intersections of the scan lines 112 and the data lines 114.

In addition, although not shown in FIG. 2, as actually shown in FIG. 3, an auxiliary capacitor (storage capacitor) 125 is provided to be parallel to the liquid crystal element 120. The auxiliary capacitor 125 has one end connected to the pixel electrode 118 and the drain electrode of the TFT 116, and the other end commonly connected to a capacitance line 115. In the embodiment, the capacitance line 115 is applied with the voltage LCcom in the same manner as the common electrode 108.

In this configuration, when the scan line driving circuits 170 selects the scan line 112 in a certain row and makes the corresponding scan line 112 have an H (high) level, the TFTs 116 of which the gate electrodes are connected to the corresponding scan line 112 are turned on, and the pixel electrodes 118 are thus electrically connected to the data lines 114. For this reason, when the scan line 112 is in the H level, and data signals of voltages according to grayscales are supplied to the data lines 114, the corresponding data signals are applied to the pixel electrodes 118 via the turned-on TFTs 116. When the scan line 112 enters an L (low) level, the TFTs 116 are turned off, however, the voltages applied to the pixel electrodes 118 are held by the capacitors of the liquid crystal elements 120 and the auxiliary capacitors 125.

The scan line driving circuits 170 select the scan lines 112 in the first row to the m-th row one by one, and the data line driving circuit 160 supplies data signals to the pixels of one row located at the selected scan line 112, via the data lines 114, and thereby voltages according to grayscales are applied to and held by all the liquid crystal elements 120. This operation is repeatedly performed for each frame (one vertical scanning period).

Thereby, in the embodiment, the data line driving circuit 160 and the scan line driving circuits 170 function as driving circuits driving the pixels 110 (the liquid crystal elements 120).

Meanwhile, in the liquid crystal element 120, the molecular alignment state of the liquid crystal 105 is varied depending on the intensity of the electric field generated between the pixel electrode 118 and the common electrode 108.

In FIG. 1A or 1B, light incident from the observing side which is the opposite substrate 102 side passes through a polarizer (not shown), the opposite substrate 102, the common electrode 108, and the liquid crystal 105, is then reflected by the pixel electrodes 118, and is emitted through the path reverse to the incident path. At this time, a ratio of the amount of emitted light to the amount of incident light to the liquid crystal element 120, that is, the reflectance is increased as voltages applied to and held by the liquid crystal elements 120 are heightened.

In this way, in the liquid crystal panel 100, the reflectance is varied for each liquid crystal element 120, and thus the liquid crystal element 120 functions as a pixel which is the minimal unit of an image to be displayed. The liquid crystal elements 120 are defined by the pixel electrodes 118 in the plan view, and thus a region where the pixel electrodes 118 are arranged is the above-described display region a.

Next, an element structure of the display region a of the element substrate 101 will be described.

Figure 4:
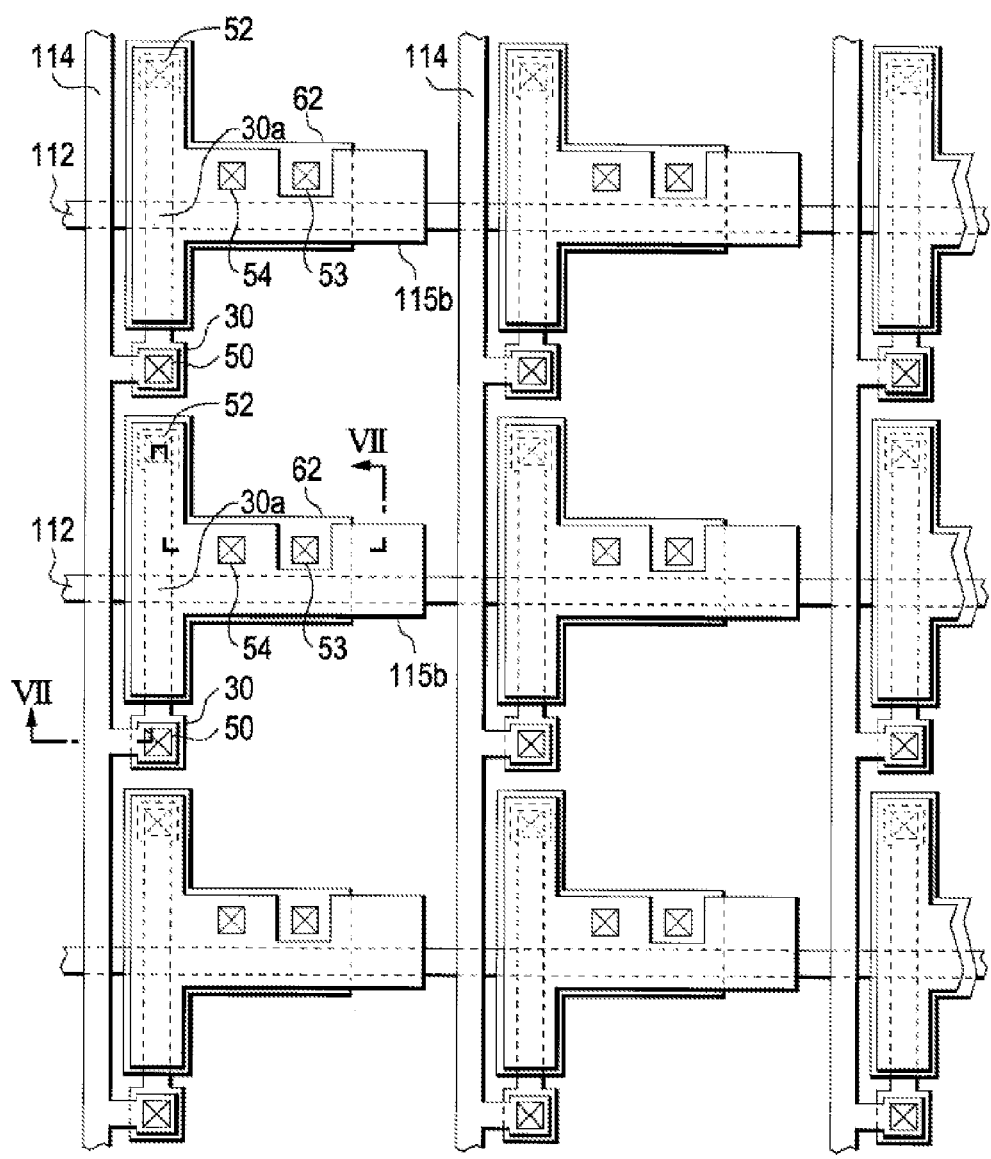
FIG. 4 is a plan view illustrating a pixel configuration in the liquid crystal panel.
Figure 5:
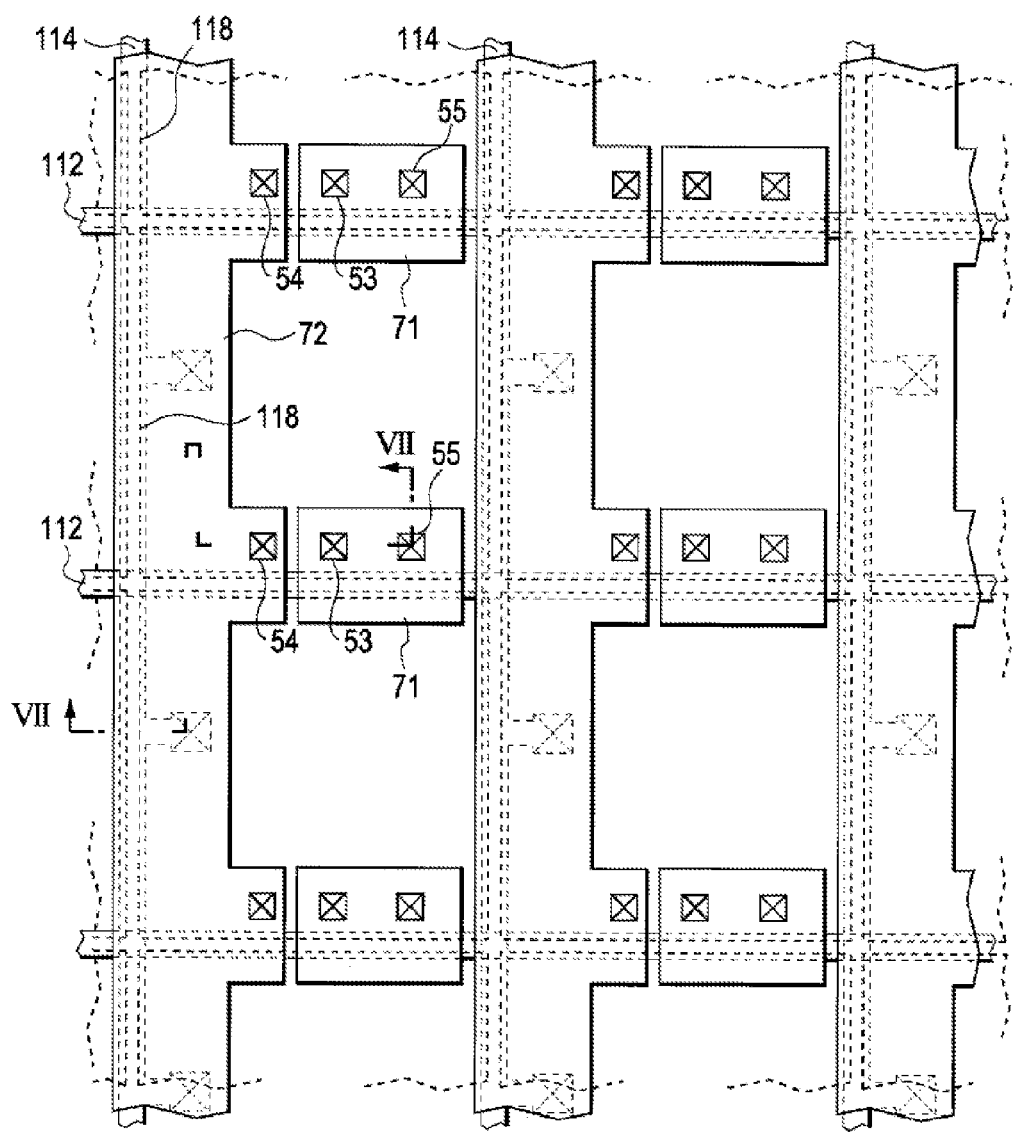
FIG. 5 is a plan view illustrating a pixel configuration in the liquid crystal panel.
Figure 6:
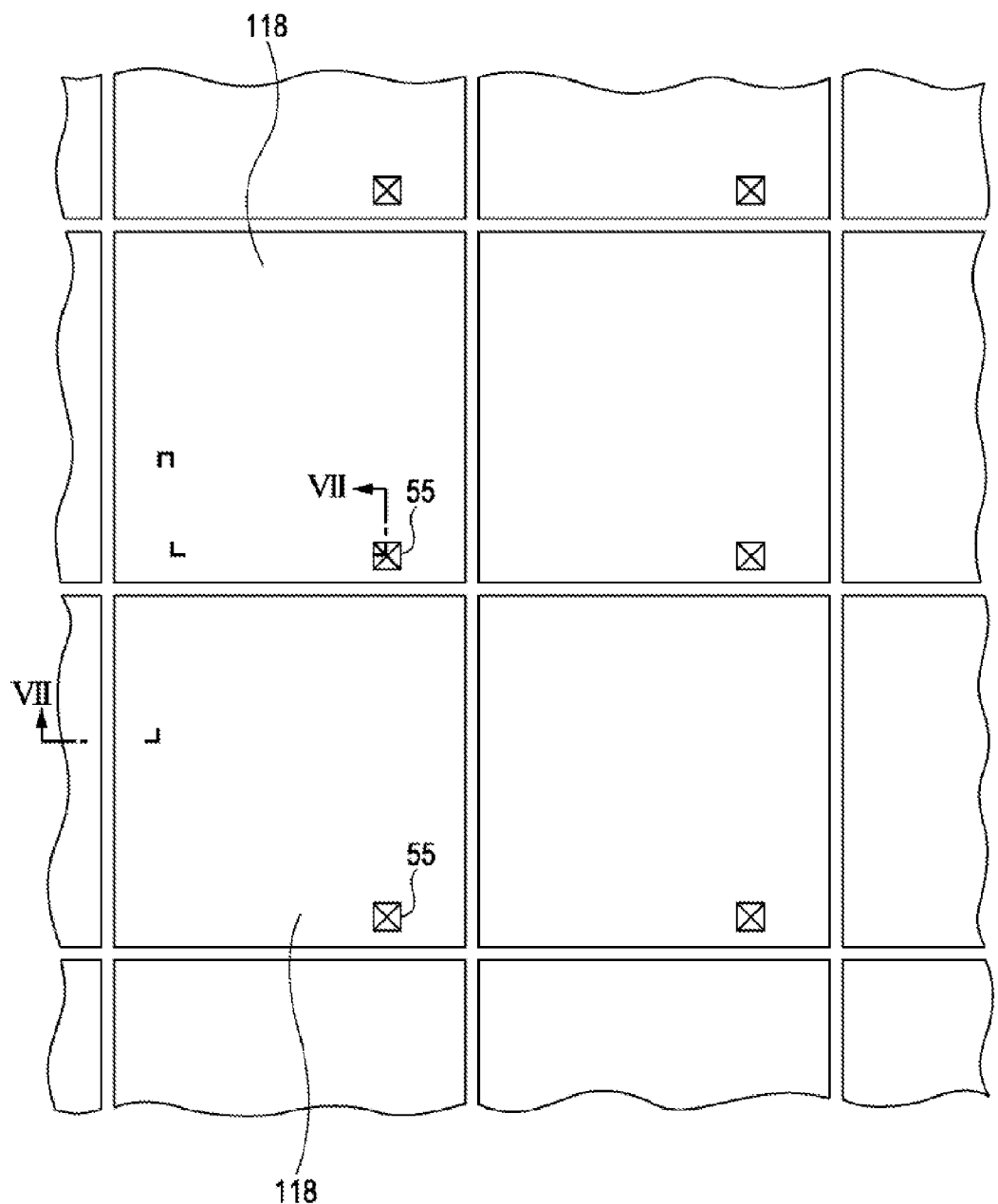
FIG. 6 is a plan view illustrating a pixel configuration in the liquid crystal panel.
Figure 7:
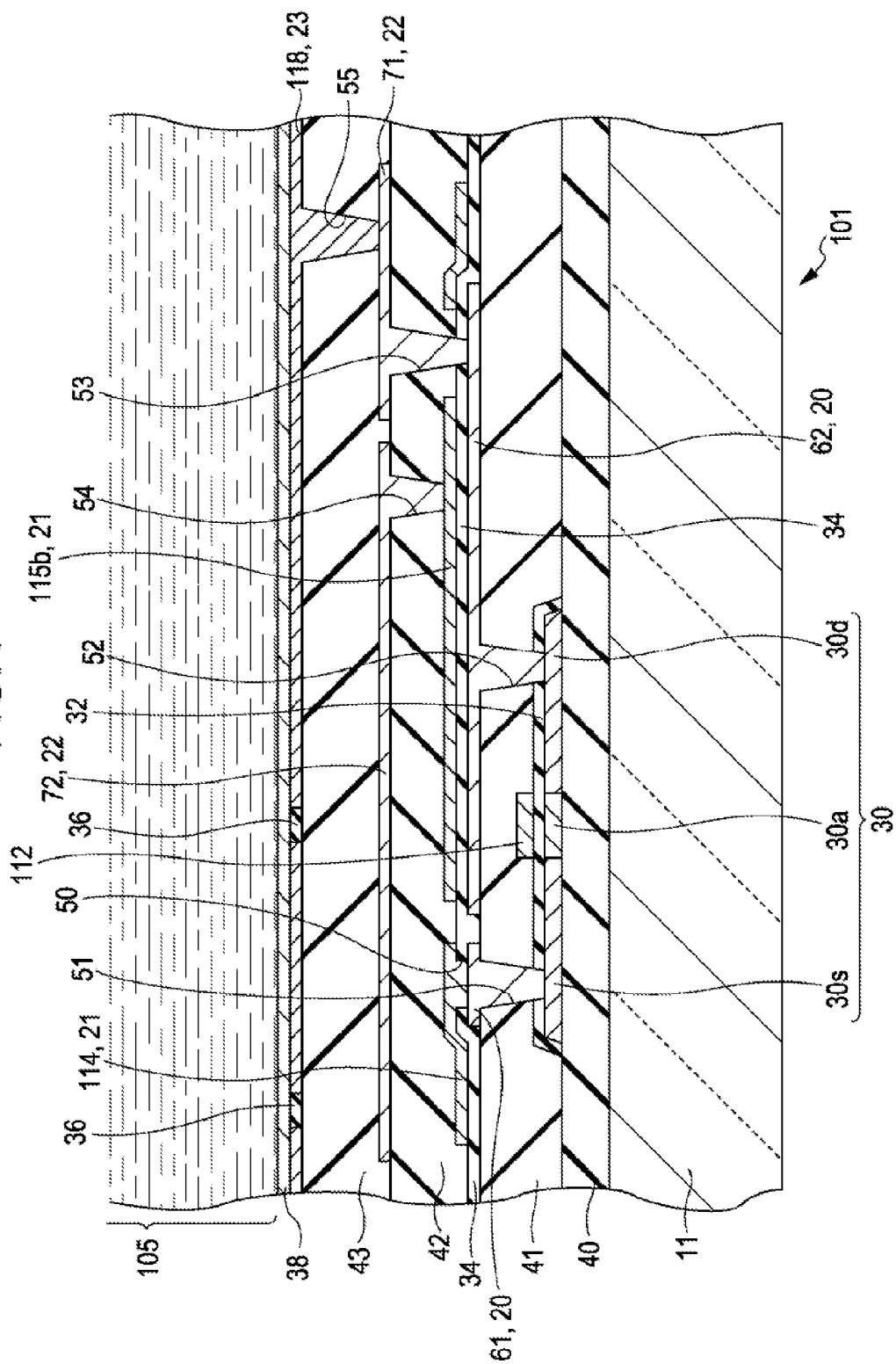
FIG. 7 is a cross-sectional view illustrating a pixel configuration in the liquid crystal panel.

FIGS. 4 to 6 are plan views illustrating configurations of the pixel, and FIG. 7 is a partial cross-sectional view taken along the line VII-VII in FIGS. 4 to 6. In addition, in FIGS. 4 to 6, in order to describe a structure of the element substrate 101 when viewed from the facing surface in plan, nonconductive films such as interlayered insulating films are not shown. Further, FIG. 4 shows the element structure up to a data line layer, FIG. 5 shows a shield electrode layer, and FIG. 6 shows a pixel electrode layer.

First, as shown in FIG. 7, a ground insulating film 40 is provided on a substrate 11 which is a base material of the element substrate 101, and a semiconductor layer 30 made of polysilicon is provided on the ground insulating film 40. The surface of the semiconductor layer 30 is covered with an insulating layer 32 through thermal oxidation. A planar shape of the semiconductor layer 30 is a rectangular shape where rectangular shapes extend in the longitudinal direction in FIG. 4, that is, in the direction in which the data lines 114 formed later extend.

The scan lines 112 extend in the transverse direction in FIG. 4, and are disposed so as to go directly at the central portion of the semiconductor layers 30 formed in the rectangular shape. As a result, as shown in FIGS. 4 and 7, a part overlapping the scan line 112 forms a channel region 30a in the semiconductor layer 30.

In the semiconductor layer 30, the left side in FIG. 7 (the lower side in FIG. 4) with respect to the channel region 30a is a source region 30s, and the right side in FIG. 7 (the upper side in FIG. 4) is a drain region 30d. Among them, the source region 30s is connected to a relay electrode 61 via a contact hole 51 which penetrates through an insulating layer 32 and a first interlayered insulating layer 41. In a similar manner, the drain region 30d is connected to a relay electrode 62 via a contact hole 52 which penetrates through the insulating layer 32 and the first interlayered insulating layer 41.

The relay electrodes 61 and 62 are respectively formed by patterning a conductive polysilicon film (electrode layer 20) formed on the first interlayered insulating layer 41. A planar shape of the relay electrode 61 is slightly larger than the contact hole 51, is hidden in a part branching from the overlying data line 114, and thus is not shown in FIG. 4. On the other hand, the relay electrode 62 has a substantially T shape including a part extending in the longitudinal direction in FIG. 4 so as to cover the semiconductor layer 30 and a part extending in the transverse direction so as to cover the scan line 112.

In FIG. 7, a dielectric layer 34 is formed to cover the first interlayered insulating layer 41 or the relay electrodes 61 and 62. In addition, the dielectric layer 34 is, for example, a silicon oxide film.

The data line 114 and a capacitance electrode 115b are formed by patterning conductive double layers formed to cover the dielectric layer 34. Specifically, the data line 114 and the capacitance electrode 115b are formed by pattering double layers (data line layer 21) of a conductive polysilicon film formed as a lower layer and an aluminum layer formed as an upper layer.

Here, the "lower layer (upper layer)" indicates a layer formed earlier (later) in the manufacturing process, or far from (close to) the facing surface.

In FIG. 4, the data line 114 extends in the longitudinal direction perpendicular to the scan line 112 in the left side of the semiconductor layer 30, is formed so as to branch toward the source region 30s (the relay electrode 61) of the semiconductor layer 30, and is connected to the relay electrode 61 via the control hole 50 which penetrates through the dielectric layer 34. Therefore, the data line 114 is connected to the source region 30s via the relay electrode 61.

The capacitance electrode 115b has a substantially T shape so as to cover the relay electrode 62, however, it partially has a notch shape in order to avoid a contact hole 53 which is connected to the drain region 30d.

In FIG. 7, a second interlayered insulating layer 42 is formed to cover the data line 114, and the capacitance electrode 115b or the dielectric layer 34. A relay electrode 71 and a shield electrode 72 are formed by patterning conductive double layers formed to cover the second interlayered insulating layer 42. Specifically, the relay electrode 71 and the shield electrode 72 are formed by patterning double layers (shield electrode layer 22) of an aluminum layer formed as a lower layer and a titanium nitride layer formed as an upper layer.

The relay electrode 71 is connected to the relay electrode 62 via the control hole 53 which penetrates through the second interlayered insulating layer 42 and the dielectric layer 34. In addition, the shield electrode 72 is connected to the capacitance electrode 115b via a contact hole 54 which penetrates through the second interlayered insulating layer 42.

In the plan view, as shown in FIG. 5, for a planar shape of the shield electrode 72, the shield electrode 72 extends in the longitudinal direction so as to cover the data line 114 and the semiconductor layer 30, and protrudes toward the right side in the transverse direction over the scan line 112.

On the other hand, for a planar shape of the relay electrode 71, as shown in the same FIG. 5, the relay electrode 71 has a rectangular shape so as to be adjacent to the right transverse protruding part of the shield electrode 72 over the scan line 112, and is formed in an island shape for each pixel.

In FIG. 7, a third interlayered insulating layer 43 is formed to cover the relay electrode 71, and the shield electrode 72 or the second interlayered insulating layer 42. The pixel electrode 118 is formed by patterning an aluminum layer (pixel electrode layer 23) formed to cover the third interlayered insulating layer 43, and is connected to the relay electrode 71 via a contact hole 55 which penetrates through the third interlayered insulating layer 43. Therefore, the pixel electrode 118 is connected to the drain electrode 30d sequentially via the relay electrode 71 and the relay electrode 62.

A planar shape of the pixel electrode 118, as shown in FIG. 6, is a substantially square shape, and, the pixel electrodes 118 are arranged such that the respective square sides have a positional relationship included in the scan lines 112 and the data lines 114 as denoted with the broken lines in FIG. 5 in the plan view.

A silicon oxide film is formed to cover the corresponding pixel electrode 118 or the third interlayered insulating layer 43 by a chemical vapor deposition using TEOS (Tetra Ethyl Ortho Silicate) as a raw material. At this time, however, the silicon oxide film formed on the surface of the pixel electrode 118 is scraped off by a CMP (Chemical Mechanical Polishing) process, and, as a result, the silicon oxide film 36 as an insulating member remains in a gap part between the pixel electrodes 118 adjacent to each other as shown in FIG. 7. Through this process, the facing surface is planarized in the display region a of the element substrate 101.

In addition, an alignment layer 38 made of an inorganic material is formed on the planarized surface. Although not shown in detail, the alignment layer 38 is vapor-deposited, for example, in a state where a plurality of micro columnar structures are oblique in the same direction, by an oblique deposition method of silicon oxide.

In FIG. 5, although not shown particularly, the shield electrode 72, which extends in the longitudinal direction for each column, is extracted to the external region c, is commonly connected, and is applied with the voltage LCcom via, for example, the terminals 107 and the contact point 107b in FIG. 2, in the same manner as the common electrode 108. Thereby, in the display region a, even if a voltage at the data line 114 is varied due to the supply of a data signal, voltage variations caused by the capacitance coupling are suppressed from being varied in the pixel electrodes 118, particularly, in the pixel electrodes 118 related to the turned-off TFTs 116.

Further, light incident from the observing side, that is, the opposite substrate 102 is not reflected by the pixel electrodes 118 at the gap part between the adjacent pixel electrodes 118 but enters the gap parts in the plan view. However, the semiconductor layer 30 is covered with the shield electrode 72, and thus the off-leak characteristic of the TFT 116 is not damaged by the light coming from the facing surface side.

In addition, the auxiliary capacitor 125 is formed by a layered structure of the relay electrode 62, the dielectric layer 34, and the capacitance electrode 115b. The capacitance electrode 115b is formed to have an isolated island shape for each pixel, however, is connected to the shield electrode 72 via the contact hole 54, and thus is commonly applied with the voltage LCcom for the respective pixels. For this reason, the equivalent circuit is given as shown in FIG. 3.

Figure 10:
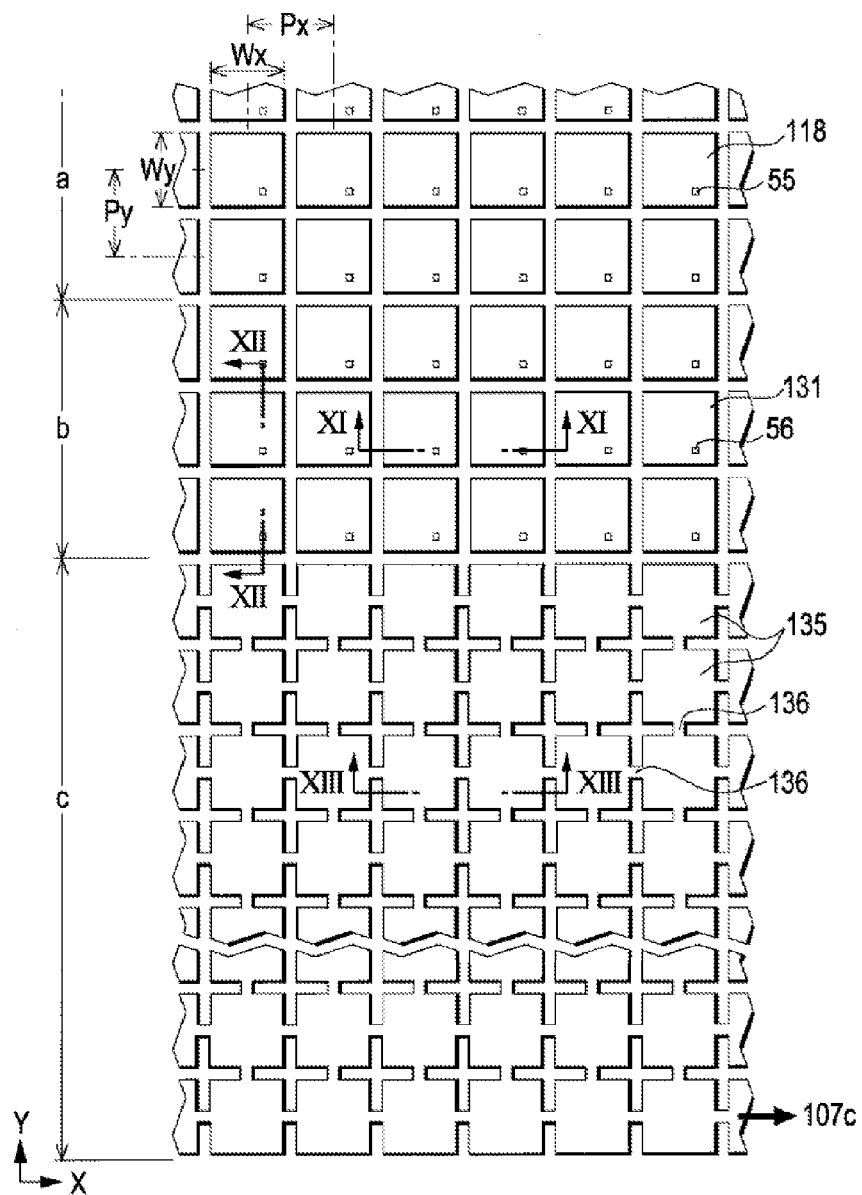
FIG. 10 is a diagram illustrating an electrode configuration in a K region.

Next, a configuration of the electrode in each region will be described. FIG. 10 is a partially enlarged plan view of the K region in FIG. 9, that is, the region where the display region a, the dummy display region b, and the external region c are arranged in the Y direction, and shows a patterned shape of the pixel electrode layer 23 when the facing surface of the element substrate 101 is viewed in plan.

As shown in the figure, the pixel electrodes 118 are arranged in a matrix in the display region a, as described above. Here, the size of the pixel electrode 118 in the X direction is assumed as Wx, and the size in the Y direction is assumed as Wy. In addition, in this specification, the pixel electrode 118 has a square shape, and thus Wx is equal to Wy.

Further, in a case where for the arrangement pitch of the pixel electrodes 118, the pitch in the X direction is assumed as Px and the pitch in the Y direction is assumed as Py when a center of the diagonal line is used as a reference, the pitch Px is the same as the arrangement interval of the data lines 114, and the pitch Py is the same as the arrangement interval of the scan lines 112. The pixel electrode 118 has a square shape, and thus Px is equal to Py.

In the embodiment, although the pixel electrode 118 has the square shape, in a case where the liquid crystal panel is applied to other usages than the light valve, for example, to an EVF (Electronic View Finder) of a digital still camera or the like, since one dot is divided by three pixels of R (red), G (green), and B (blue), and one dot is configured to have a square shape, the pixel electrode 118 corresponding to each color has a rectangular shape. For this reason, for the size of the pixel electrode 118, Wx is not necessarily equal to Wy, and, for the pitch as well, Px is not necessarily equal to Py.

On the dummy display region b, dummy pixel electrodes 131 formed by patterning the pixel electrode layer 23 are provided. The dummy pixel electrodes 131 are formed to have the size of Wx in the X direction and the size of Wy in the Y direction, that is, are formed to have the same size and pitch as the pixel electrode 118, and are arranged in a matrix so as to be aligned with the arrangement of the pixel electrodes 118.

In addition, the dummy pixel electrode 131 is connected to the underlying shield electrode 72 via the contact hole 56 as described the next, however, in the plan view, a relative position where the contact hole 56 is provided with respect to the shape of the dummy pixel electrode 131 is the same as the position of the contact hole 55 with respect to the pixel electrode 118.

For this reason, seemingly (that is, when the pixel electrode layer is viewed from the upper surface), it is difficult to differentiate the dummy pixel electrode 131 from the pixel electrode 118.

In this example, the dummy pixel electrodes 131 are provided over three rows in the K region of the dummy display region b.

Figure 11:
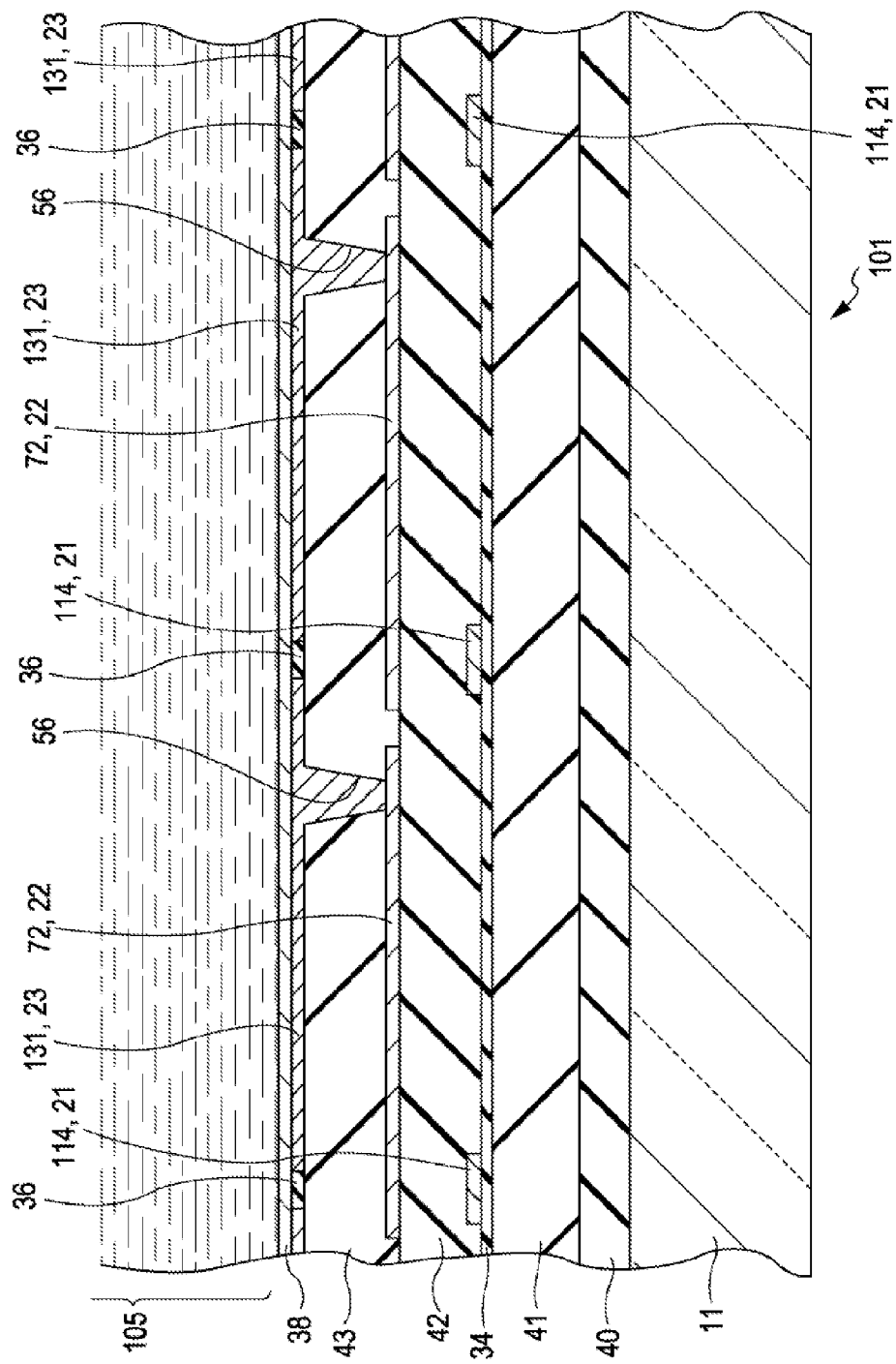
FIG. 11 is a diagram illustrating a cross-sectional configuration of a dummy display region.
Figure 12:
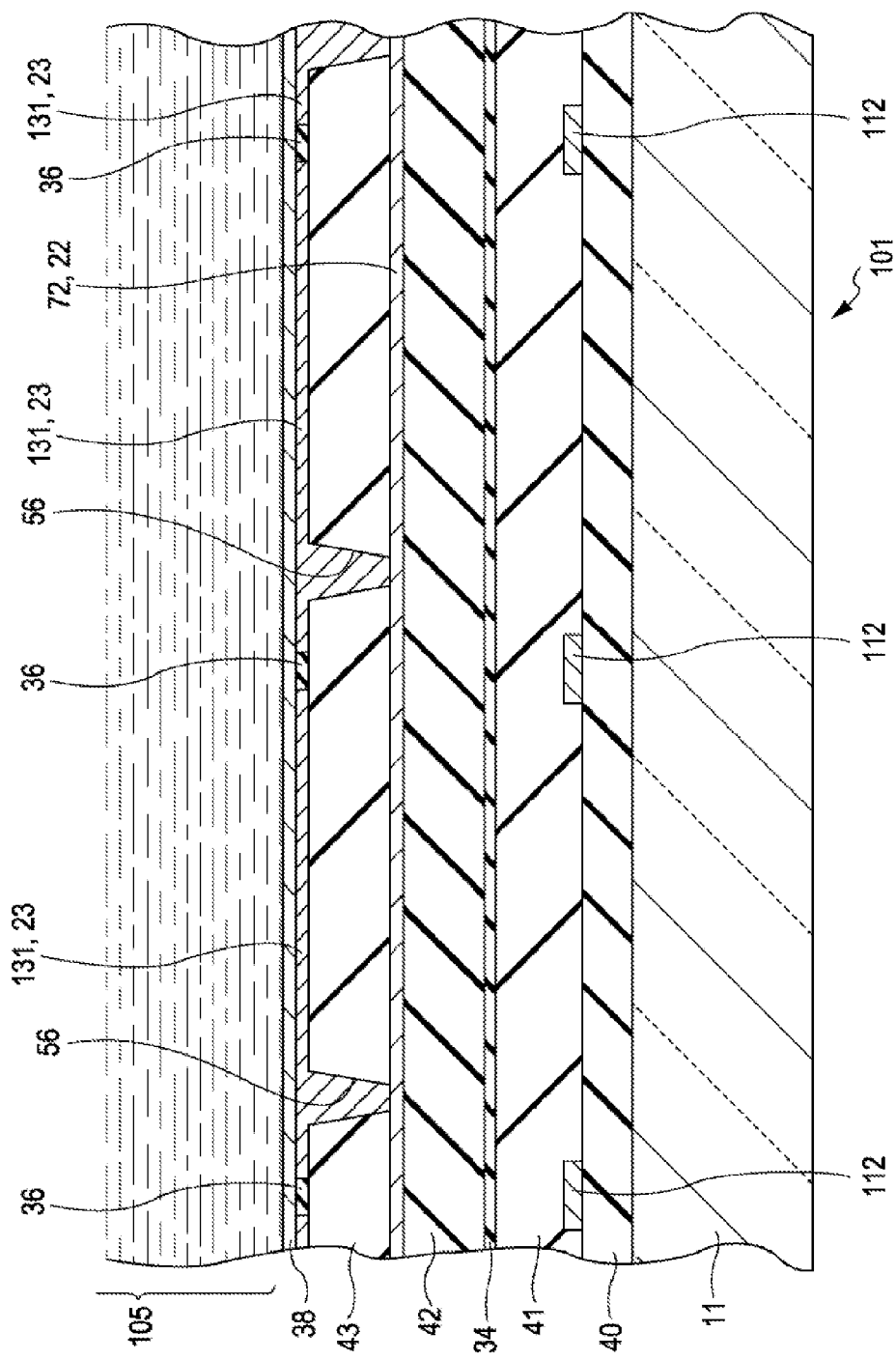
FIG. 12 is a diagram illustrating a cross-sectional configuration of the dummy display region.

FIGS. 11 and 12 are partial cross-sectional views illustrating a structure of the element substrate 101 when respectively taken along the line XI-XI in FIG. 10 (X direction) and the line XII-XII in FIG. 10 (Y direction) so as to include the dummy pixel electrode 131.

As shown in the figures, the shield electrode 72 is provided extending in the Y direction so as to cover the data line 114, and extends to the contact hole 56 as shown in FIG. 11.

The dummy pixel electrode 131 is connected to the shield electrode 72 via the contact hole 56 which penetrates through the third interlayered insulating layer 43. The shield electrode provided extending in the Y direction connects the dummy pixel electrodes 131 adjacent in the Y direction to each other, is extracted to the external region c so as to be commonly connected as described above, and has applied to it the voltage LCcom. For this reason, each of the dummy pixel electrodes 131 has applied to it the voltage LCcom in the same manner as the common electrode 108.

Further, in the plan view, the silicon oxide films 36 are buried in the gap parts between the dummy pixel electrodes 131 by the CMP process in the display region a as shown in FIG. 11 or 12. In the dummy display region b, since the liquid crystal 105 is sandwiched by the dummy pixel electrode 131 and the common electrode 108, a kind of liquid crystal element is formed, but does not contribute to displaying, which is thus represented as an invalid liquid crystal element.

FIG. 11 does not show the scan lines 112 since the K region is taken along the line XI-XI in the X direction. In addition, FIG. 12 does not show the data lines 114 since the K region is taken along the line XII-XII in the Y direction.

Referring to FIG. 10 again, a conductive pattern 135, which is obtained by patterning the pixel electrode layer 23, is provided in the external region c. The conductive pattern 135 is patterned by arranging electrodes having the same size as the pixel electrodes 118 (the dummy pixel electrodes 131) in a matrix in the same arrangement as the pixel electrodes 118, and by connecting the electrodes, which are adjacent to each other longitudinally and transversely, to each other via connection portions 136 around the center of each side.

The conductive pattern 135 is not directly connected to any dummy pixel electrode 131 via the pixel electrode layer 23. However, in the embodiment, the conductive pattern 135 is applied with the voltage LCcom via the terminals 107 and the connection point 107c shown in FIG. 2. For this reason, the conductive pattern 135 may be indirectly connected via other conductive layers.

In addition, the conductive pattern 135 may be electrically floated with the other electrodes including the dummy pixel electrodes 131.

Figure 13:
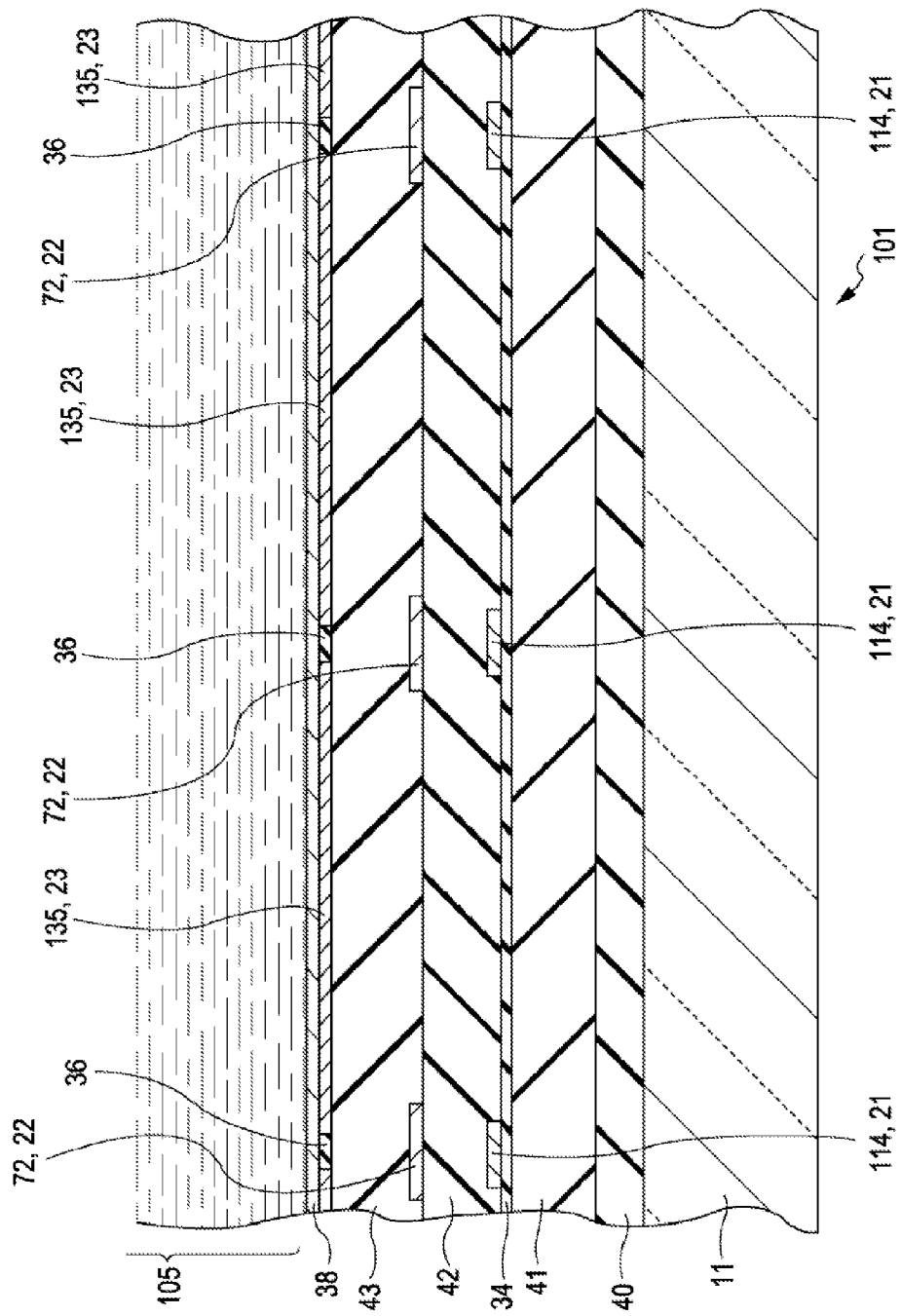
FIG. 13 is a diagram illustrating a cross-sectional configuration of an external region.

FIG. 13 is a partial cross-sectional view illustrating a structure of the element substrate 101 when taken along the line XIII-XIII in FIG. 10. In addition, FIG. 13 shows a region, which is located outside the dummy display region b and where the data line driving circuit 160 is provided, in a range of the sealing material 90 in the external region c.

As shown in the figure, the conductive patterns 135 are not connected to any underlying wires such as the shield electrodes 72 or the data lines 114. Further, in the plan view, as shown in FIG. 13, the silicon oxide films 36 are buried in the gap parts in the conductive pattern 135 by the CMP process in the display region a.

Figure 14:
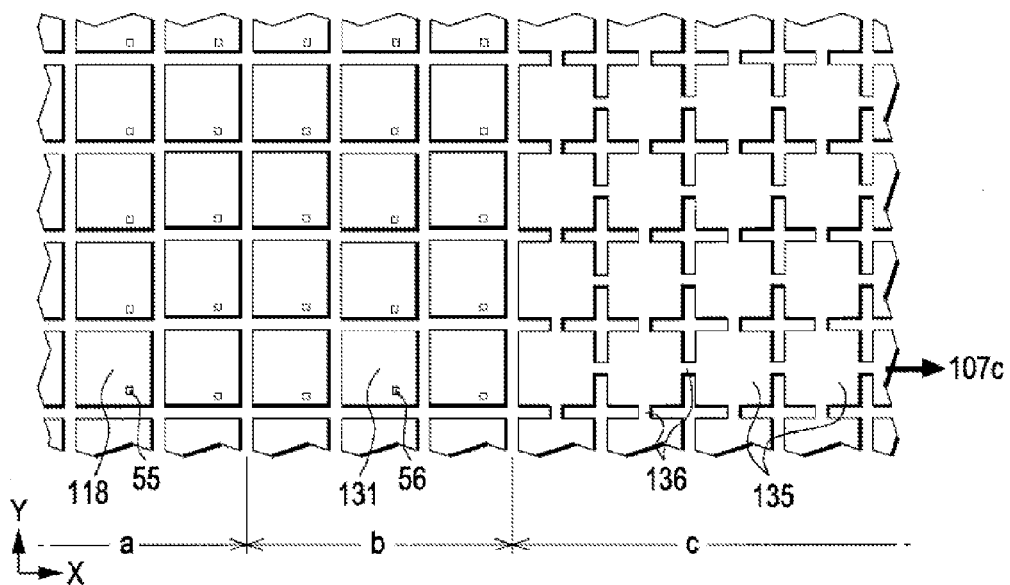
FIG. 14 is a diagram illustrating an electrode configuration in an L region.

FIG. 14 is a partially enlarged plan view of the L region in FIG. 9, that is, the region where the display region a, the dummy display region b, and the external region c are arranged in the X direction, and shows a patterned shaped of the pixel electrode layer 23 when the facing surface of the element substrate 101 is viewed in plan.

As shown in the figure, the dummy pixel electrodes 131 are arranged in three columns in the dummy display region b adjacent to the display region a in which the pixel electrode 118 are arranged, and the conductive pattern 135 is provided so as to be adjacent to the dummy display region b.

In the liquid crystal panel 100 according to the embodiment, when viewed in plan, the dummy pixel electrodes 131 in the dummy display region b are formed substantially at the same wiring density (for example, the same size and pitch) as the pixel electrode 118, so as to surround the display region a in which the pixel electrode 118 are arranged. Further, in the liquid crystal panel 100, the silicon oxide films 36 are buried in the gaps between the pixel electrodes 118 and the gaps between the dummy pixel electrodes 131 by the CMP process, and thereby they are planarized. For this reason, in the liquid crystal panel 100, a difference in the flatness is difficult to generate from the display region a to the dummy display region b. In addition, the phrase "substantially the same" mentioned here means that the pitch in the size of the pixel electrodes 118 with respect to the dummy pixel electrodes 131 is in a range of ±3%. This is because, in this range, even if manufacturing errors are taken into account, the influence of a difference in flatness can be neglected.

In addition, in the plan view, the contact hole 56 which connects the dummy pixel electrode 131 to the shield electrode 72 is provided at the same position as the contact hole 55 which connects the pixel electrode 118 to the relay electrode 71. For this reason, the influence of the step difference caused by the presence of the contact holes can be substantially the same in the display region a and the dummy display region b.

Since the dummy pixel electrode 131 is applied with the voltage LCcom via the shield electrode 72, in the invalid liquid crystal element, that is, in the liquid crystal element where the liquid crystal 105 is sandwiched by the dummy pixel electrode 131 and the common electrode 108, a voltage applied to the corresponding liquid crystal 105 becomes zero. Therefore, the invalid liquid crystal element displays black in the normally black mode, and thus the dummy display region b functions as the break line (frame) surrounding the display region a.

Further, in the external region c surrounding the dummy display region b, the conductive pattern 135 is provided, and is planarized by burying the silicon oxide films 36 in the gaps therebetween through the CMP process. Therefore, in the liquid crystal panel 100, a difference in the flatness is difficult to generate from the dummy display region b to the external region c.

Second Embodiment

Next, a second embodiment of the invention will be described. Although the dummy pixel electrode 131 is connected to the shield electrode 72 and is thus applied with the voltage LCcom in the first embodiment, the dummy pixel electrode 131 is connected to a wire formed by patterning the electrode layer 20 or the data line layer 21 instead of the shield electrode 72 (the wire formed by patterning the shield electrode layer 22), and is thus applied with voltages other than the voltage LCcom in the second embodiment.

Figure 15:
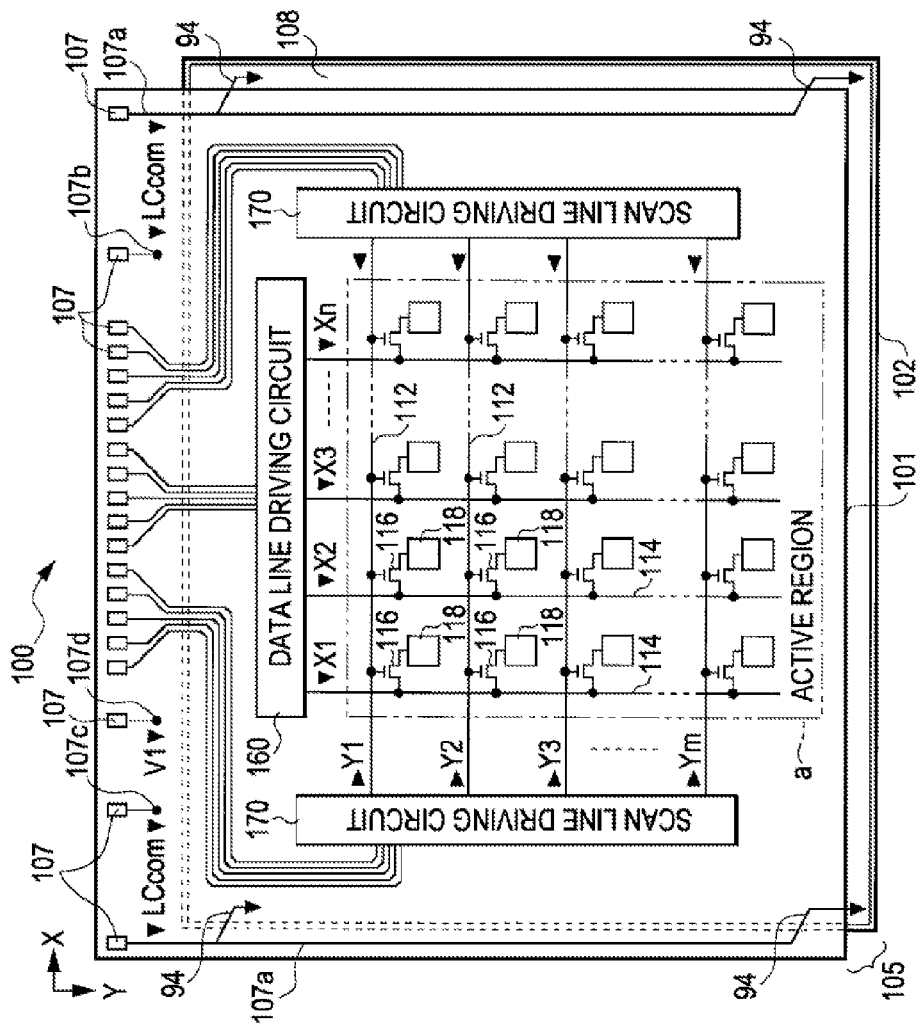
FIG. 15 is a diagram illustrating a circuit configuration of a liquid crystal panel according to a second embodiment.

FIG. 15 is a diagram illustrating an electric configuration of a liquid crystal panel according to the second embodiment. In the second embodiment, since the dummy pixel electrode 131 is applied with voltages other than the voltage LCcom, it is supplied with a signal V1 via the terminal 107 and a connection point 107d. A voltage of the signal V1 will be described later.

Figure 16:
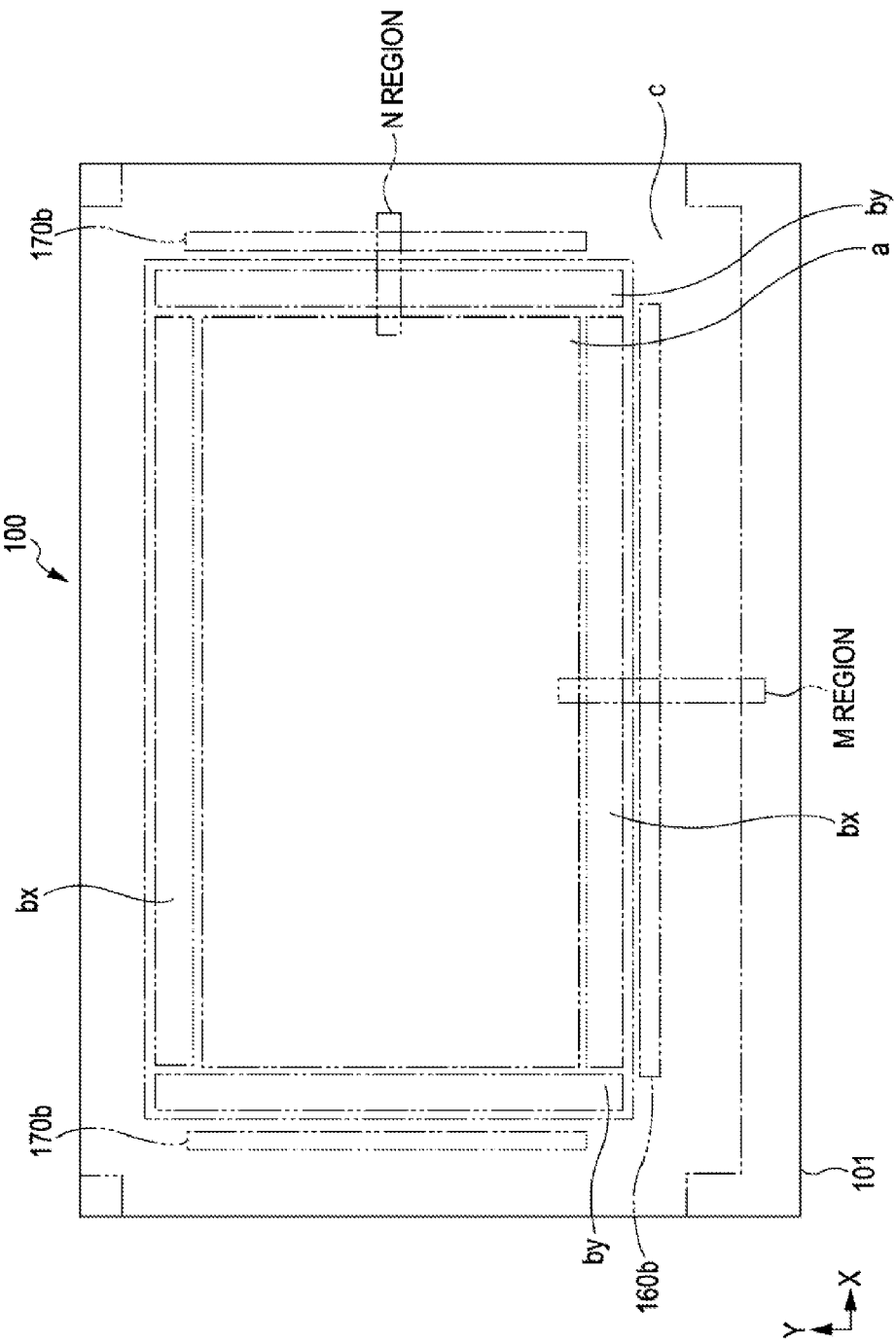
FIG. 16 is a plan view illustrating respective regions of the liquid crystal panel to be partitioned.

FIG. 16 is a diagram illustrating respective regions of the element substrate 101 in the second embodiment. FIG. 16 is different from FIG. 1 in that the dummy display region can be divided into first dummy display regions bx and second dummy display regions by.

Of them, the first dummy display regions bx correspond to a region located between the display region a and a region 160b where the data line driving circuit 160 is provided, and a region located at the opposite side to the region 160b. The second dummy display regions by correspond to two regions located between the display region a and the regions 170b in which the scan line driving circuits 170 are provided.

Since the data lines 114 are provided from the data line driving circuit 160 to the display region a so as to extend in the Y direction, the dummy pixel electrodes 131 are difficult to connect to each other in the X direction using wires formed by patterning the data line layer 21, in the region located at the same side as the region 160b (that is, the lower region in FIG. 16) of the first dummy display regions bx. On the other hand, in the region opposite side to the region 160b (that is, the upper region in FIG. 16) of the first dummy display regions bx, there is a case where the data line driving circuit 160 is provided, however, an inspection circuit for the data lines 114 is provided. In this case, the dummy pixel electrodes 131 are difficult to connect to each other using wires formed by patterning the data line layer 21. Therefore, in the second embodiment, the dummy pixel electrodes 131 are connected to each other using wires formed by patterning the electrode layer 20 in the first dummy display regions bx.

In addition, as described above, the regions by of the dummy display regions in the X direction are different from the first dummy display regions bx in that the data line driving circuit 160 is not present, however, the circumstances are the same, and thus they are not differentiated from each other in the second embodiment.

Figure 17:
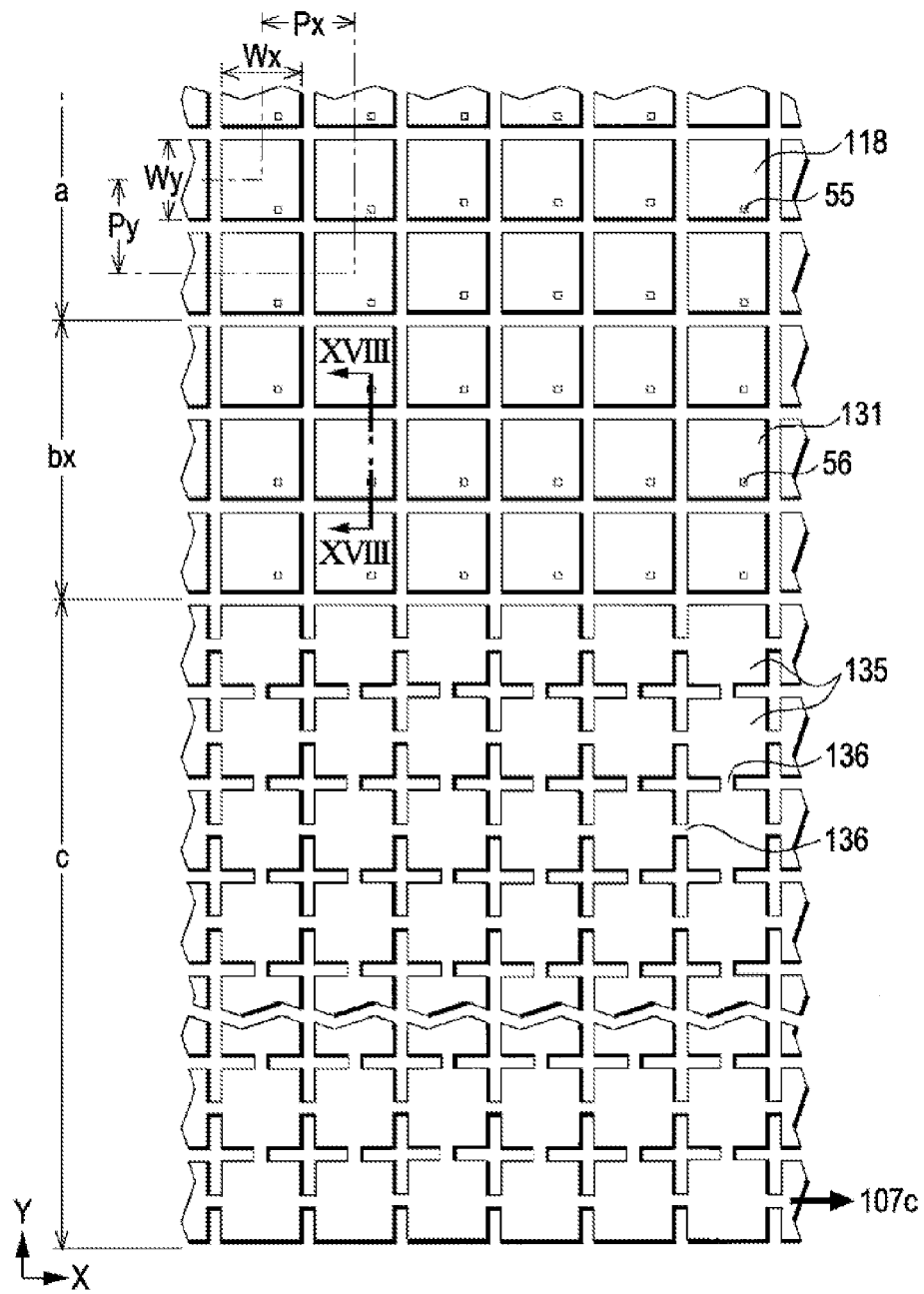
FIG. 17 is a diagram illustrating an electrode configuration in an M region.

FIG. 17 is a partially enlarged plan view of the M region in FIG. 16, that is, the region where the display region a, the dummy display region b, and the external region c are arranged in the Y direction, and shows a patterned shape of the pixel electrode layer 23 when is viewed in plan.

As shown in the figure, the pixel electrode 118, the dummy pixel electrode 131, and the conductive pattern 135 formed by patterning the pixel electrode layer 23 are the same as in the first embodiment shown in FIG. 10.

Figure 18:
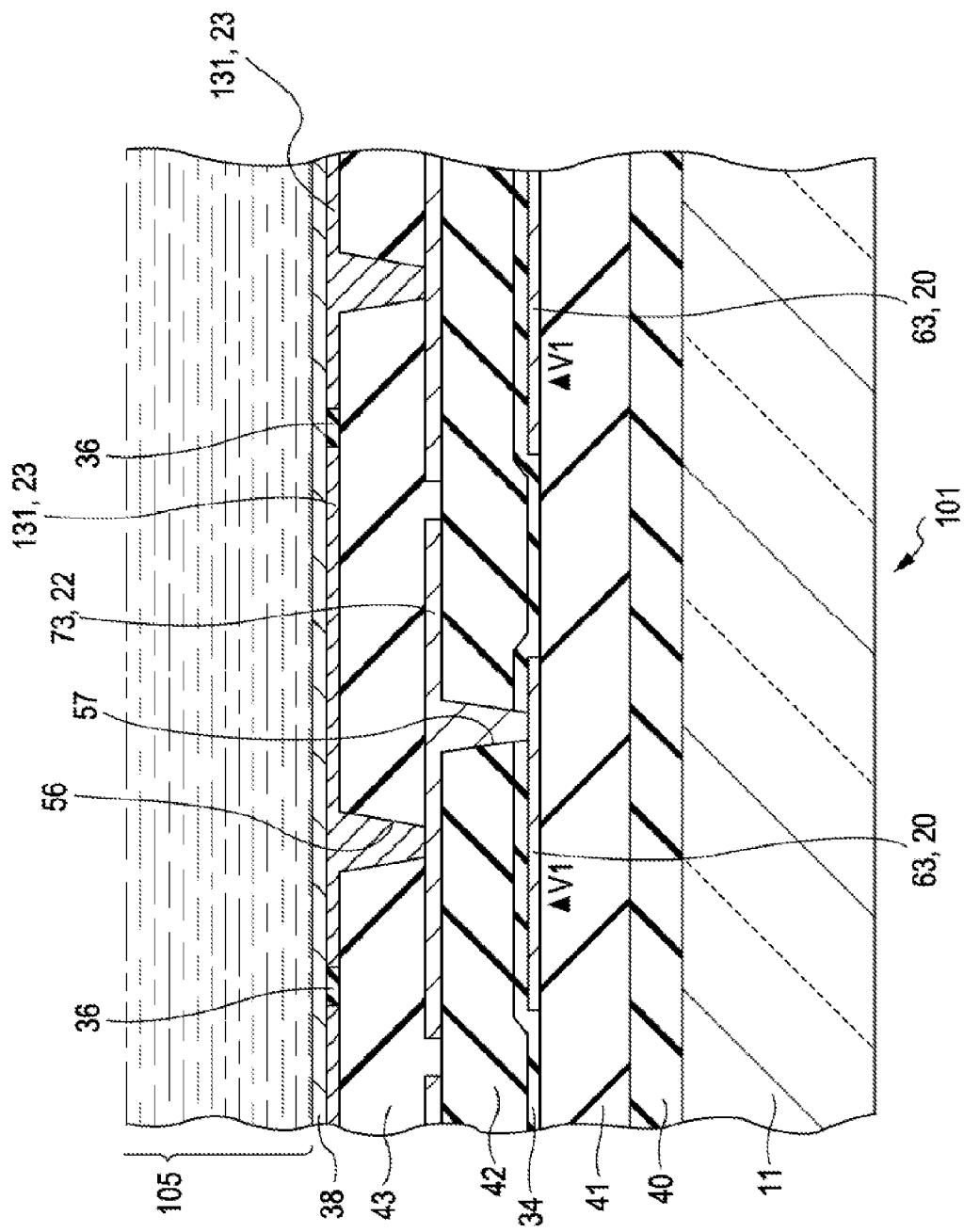
FIG. 18 is a diagram illustrating a cross-sectional configuration of a dummy display region in the liquid crystal panel.

FIG. 18 is a partial cross-sectional view illustrating a structure when taken along the line XVIII-XVIII so as to include the dummy pixel electrodes 131 in the M region shown in FIG. 17.

As shown in FIG. 18, the dummy pixel electrode 131 in the dummy display region bx is connected to a relay electrode 73 via the contact hole 56 which penetrates through the third interlayered insulating layer 43. The relay electrode 73 is formed by patterning the shield electrode layer 22 in an island shape for each dummy pixel electrode 131. For this reason, the relay electrode 73 interferes with neither of the relay electrode 71 and the shield electrode 72 in the display region a.

Further, the relay electrode 73 is connected to a wire 63 via a contact hole 57 which penetrates through the second interlayered insulating layer 42 and the dielectric layer 34. The wire 63 is provided extending in the vertical direction with respect to the paper surface in FIG. 18 (the X direction in FIG. 17) by patterning the electrode layer 20 forming the relay electrodes 61 and 62 shown in FIG. 7 for each row, and is an example of a first wire.

The wire 63 provided extending in the X direction connects the dummy pixel electrodes 131 adjacent in the X direction to each other, is extracted to the external region c so as to be commonly connected although not shown particularly, and is supplied with the signal V1 via the connection point 107d and the terminal 107 in FIG. 15. Thereby, in the dummy display region bx, the respective dummy pixel electrodes 131 are commonly applied with the signal V1.

Figure 19:
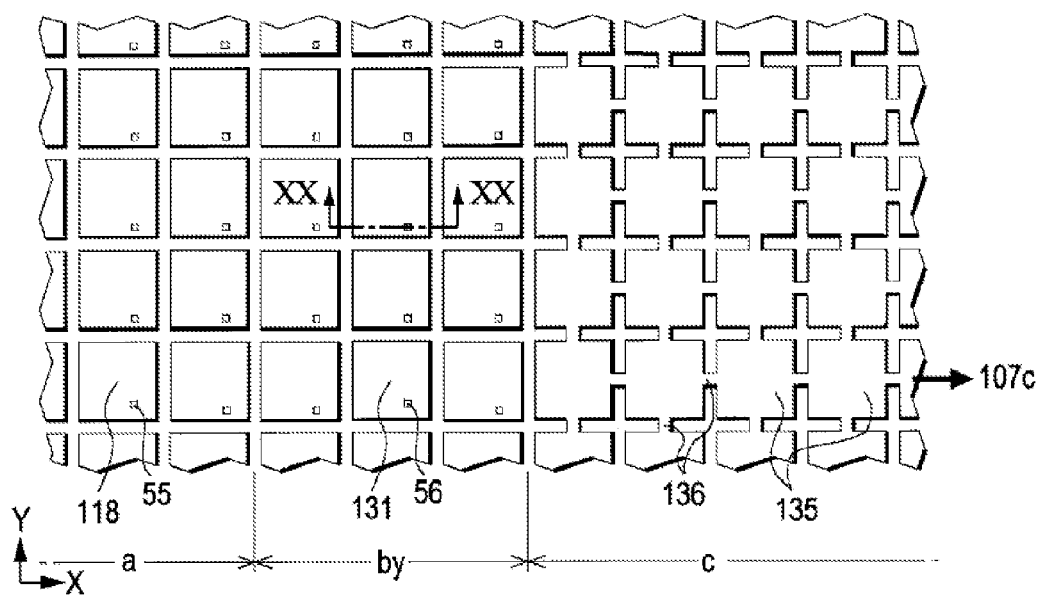
FIG. 19 is a diagram illustrating an electrode configuration in an N region.

FIG. 19 is a partially enlarged plan view of the N region in FIG. 16, that is, the region where the display region a, the second dummy display region by, and the external region c are arranged in the X direction, and shows a patterned shape of the pixel electrode layer 23 when is viewed in plan. As shown in the figure, the pixel electrode 118, the dummy pixel electrode 131, and the conductive pattern 135 formed by patterning the pixel electrode layer 23 are the same as in the first embodiment shown in FIG. 14.

Figure 20:
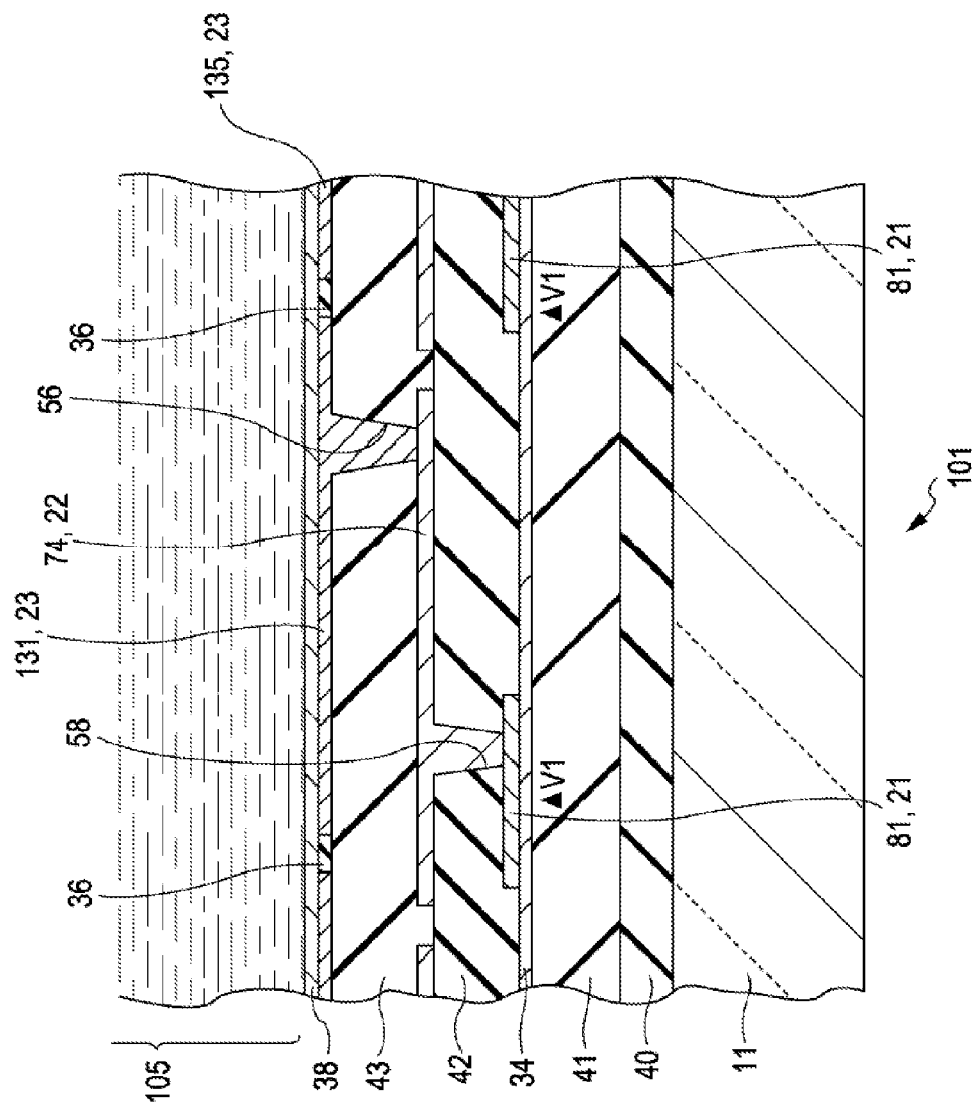
FIG. 20 is a diagram illustrating a cross-sectional configuration of a dummy display region in the liquid crystal panel.

FIG. 20 is a partial cross-sectional view illustrating a structure when taken along the line XX-XX in the X direction so as to include the dummy pixel electrodes 131 in the N region.

As shown in the figure, the dummy pixel electrode 131 in the second dummy display region by is connected to a relay electrode 74 via the contact hole 56. The relay electrode 74 is formed by patterning the shield electrode layer 22 in an island shape for each dummy pixel electrode 131 in a manner similar to the relay electrode 73. The relay electrode 74 is connected to a wire 81 via a contact hole 58 which penetrates through the second interlayered insulating layer 42. The wire 81 is provided extending in the vertical direction with respect to the paper surface in FIG. 20 (the Y direction in FIG. 19) by patterning the data line layer 21 forming the data line 114 or the capacitance electrode 115b shown in FIG. 7 for each column, and is an example of a second wire.

The wire 81 provided extending in the Y direction connects the dummy pixel electrodes 131 adjacent in the Y direction to each other, is extracted to the external region c so as to be commonly connected although not shown particularly, and is supplied with the signal V1 via the connection point 107d and the terminal 107 in FIG. 15. Thereby, in the dummy display region by as well, the respective dummy pixel electrodes 131 are commonly applied with the signal V1. In addition, since the second dummy display regions by are located between the scan line driving circuits 170 and the display region a, the data lines 114 are not present in FIG. 20.

Figure 22:
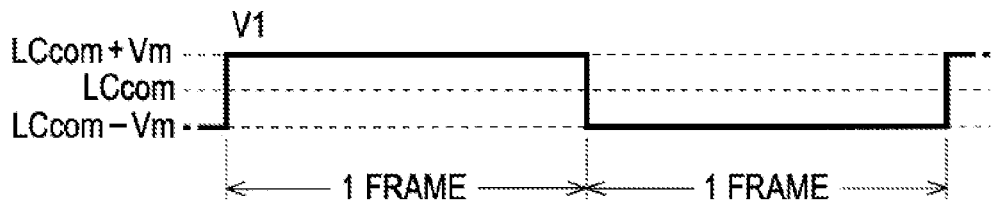
FIG. 22 is a diagram illustrating a voltage waveform of a signal applied to a dummy pixel electrode.

FIG. 22 is a voltage waveform diagram of the signal V1 supplied to the dummy pixel electrode 131 in the second embodiment. As shown in the figure, the signal V1 is supplied by alternately changing between a voltage (LCcom+Vm) higher than the voltage LCcom, which is applied to the common electrode 108, by the voltage Vm, and a voltage (LCcom−Vm) lower than the voltage LCcom by the voltage Vm for each frame.

Figure 23A:
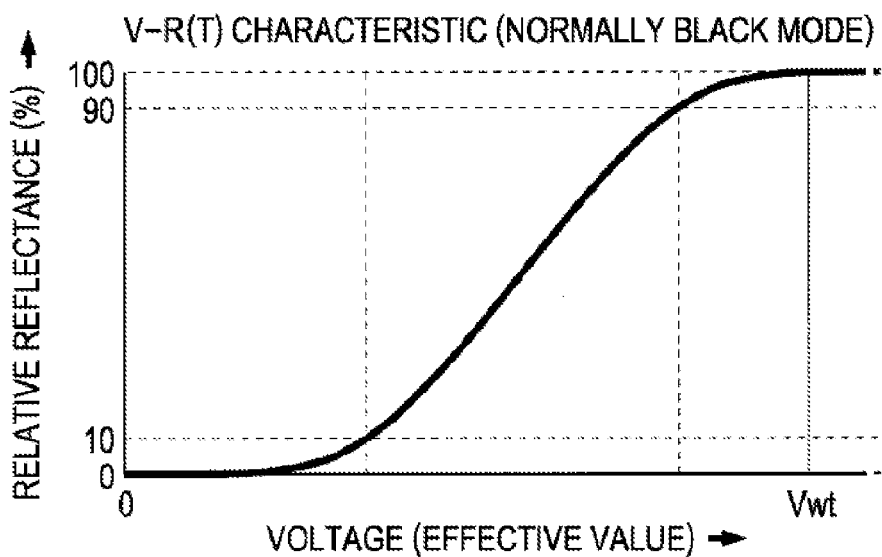
FIGS. 23A and 23B are diagrams illustrating a voltage-reflectance characteristic for describing a voltage of the signal.

In the voltage-reflectance characteristic of the liquid crystal elements 120 including the invalid liquid crystal elements, in the case of the normal black mode, generally, the reflectance is 0% at the zero voltage, and the reflectance is increased as the voltage is heightened, and is finally saturated in 100%, as shown in FIG. 23A. FIG. 23A shows the relative reflectance normalized by setting the minimum reflectance to 0% and the maximum reflectance to 100% when a voltage applied to the liquid crystal element 120 (a potential difference between the pixel electrode 118 or the dummy pixel electrode 131 and the common electrode 108) is expressed by the transverse axis.

Figure 23B:
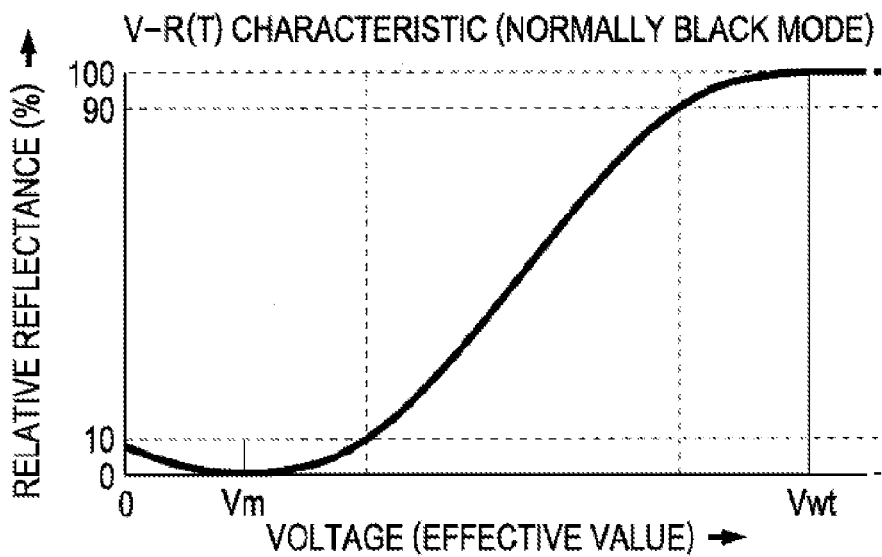

However, through various factors such as the characteristics of the liquid crystal 105 or the pretilt angle by the alignment layer 38, there is a case where the reflectance becomes 0% not at the zero voltage but at the voltage Vm as shown in FIG. 23B. In this case, there is a possibility that the dummy display region b may not display sufficient black even if a voltage applied to the invalid liquid crystal elements is zero by applying the voltage LCcom to the dummy pixel electrodes 131.

With regard thereto, in the second embodiment, even in a case where the liquid crystal element has the characteristics as shown in FIG. 23B, a voltage enabling black to be displayed is applied to the dummy pixel electrodes 131, and thus the dummy display region b can function as the break line (frame) surrounding the display region a. In addition, the dummy pixel electrodes 131 alternately change between the voltage (LCcom+Vm) and the voltage (LCcom−Vm) for each frame, and thereby a DC component is not applied to the invalid liquid crystal elements in terms of reference units of two frames. Therefore, there is no case where the liquid crystal 105 sandwiched by the dummy pixel electrode 131 and the common electrode 108 is deteriorated due to application of the DC component.

Figure 21:
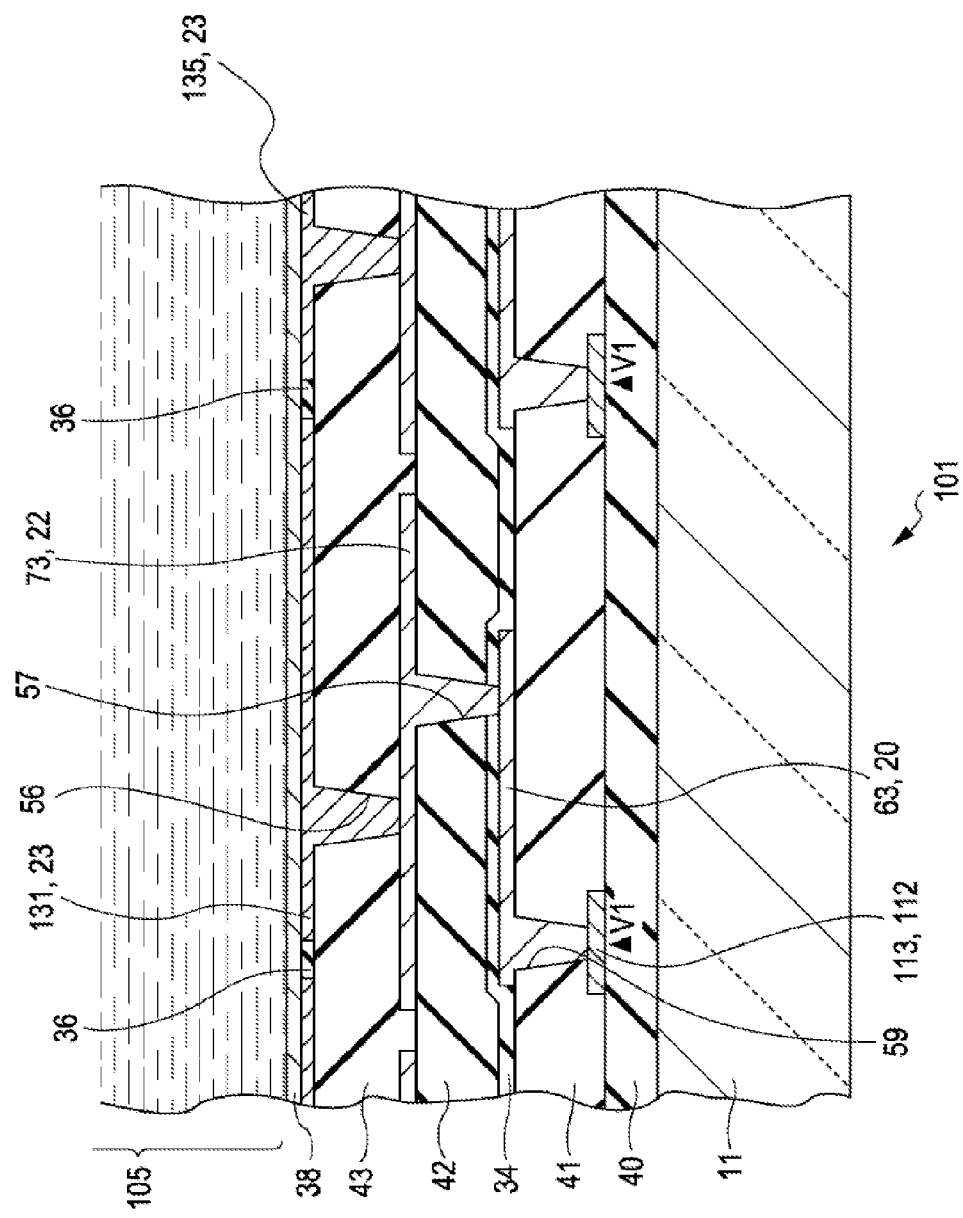
FIG. 21 is a diagram illustrating a cross-sectional configuration of a dummy display region in the liquid crystal panel.

In addition, in the second embodiment, although the signal V1 is supplied to the dummy pixel electrode 131 sequentially via (the terminal 107, the connection point 107*d*), the wire 63, and the relay electrode 73, that is, supplied using the wire 63 formed by patterning the electrode layer 20 in the first dummy display regions bx, the invention is not limited thereto, but, for example, the signal V1 may be supplied using a wire 113 as shown in FIG. 21. The wire 113 is formed by patterning the polysilicon layer forming the scan lines 112, and is another example of the first wire. In addition, in FIG. 21, the relay electrode 73 is connected to the wire 113 via the contact hole 59 which penetrates through the first interlayered insulating layer 41.

At this time, the wire 63 may function as a relay electrode by being formed in an island shape for each dummy pixel electrode 131, or, as described with reference to FIG. 18, the wire 63 may be provided so as to extend in the Y direction as a wire and may be used to reduce a wire resistance through parallel connection to the wire 113.

In addition, in the second embodiment, although a voltage of the signal V1 applied to the dummy pixel electrode 131 alternately changes between (LCcom+Vm) and (LCcom−Vm) when the effective voltage value is Vm at the minimum reflectance of the liquid crystal element 120, the voltage Vm is not limited to the voltage when the reflectance of the liquid crystal element 120 is minimum, but, for example, it may use a voltage (gray voltage) when the reflectance is 50%. The changing period of the voltage may not be one frame.

In the second embodiment, if the liquid crystal element has the characteristic as shown in FIG. 23A, the voltage LCcom may be applied to the dummy pixel electrode 131 via the wire 63 or the wire 81.

In addition, in the first embodiment or the second embodiment, although the dummy pixel electrodes 131 are arranged in three rows or three columns in the dummy display region b (bx and by), the dummy pixel electrodes 131 may be arranged in one row or one column, two rows and two columns, or four or more rows or four or more columns. Further, the liquid crystal panel 100 is not limited to the reflective type but may be of a transmissive type.

MODIFIED EXAMPLE

Figure 25:
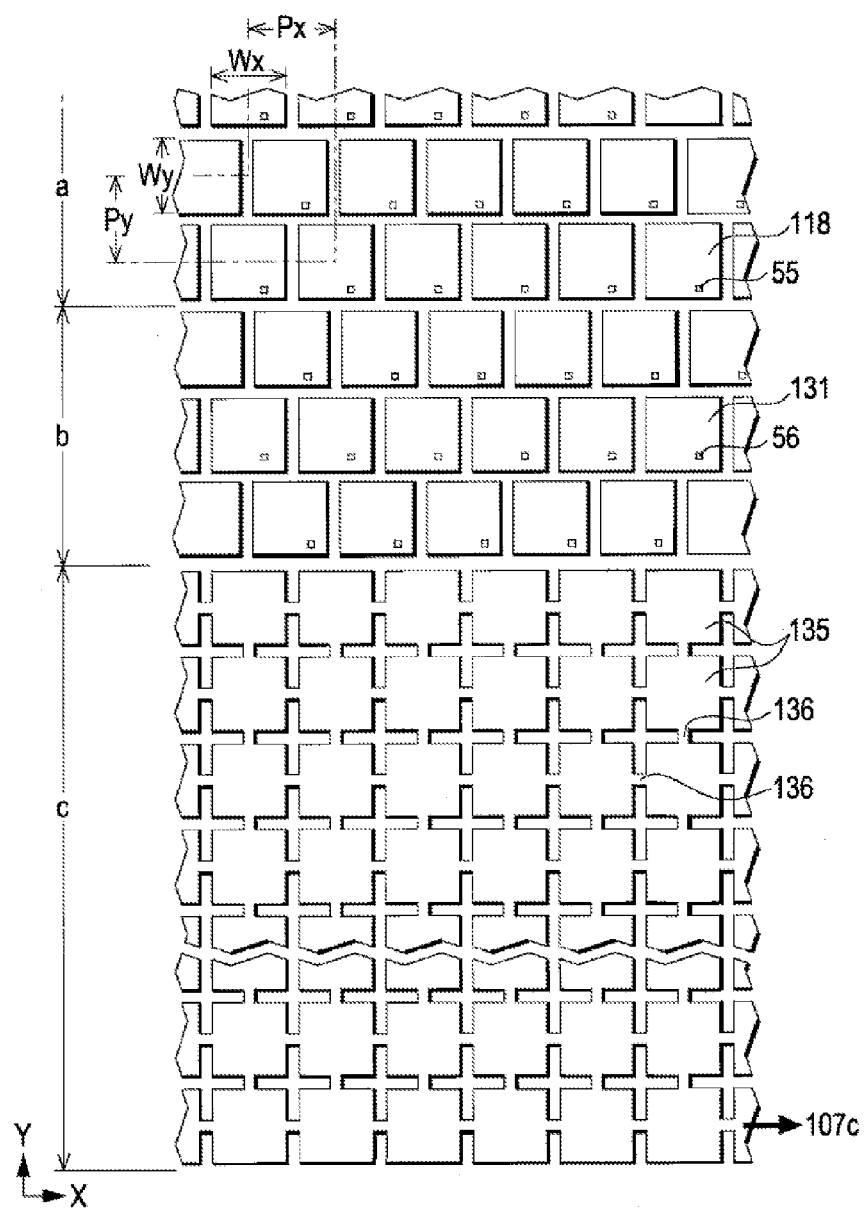
FIG. 25 is a diagram illustrating another example of the electrode configuration in the K region.

FIG. 25 is a diagram illustrating another example of the electrode configuration in the K region. The electrode configuration in the K region is not limited to the example shown in FIG. 10. FIG. 25 shows an example where the electrodes have a staggered arrangement (delta arrangement). The x coordinate for the reference point (for example, the bottom-left vertex) of the pixel electrode 118 in an odd numbered row is misaligned with that for the reference point of the pixel electrode 118 in an even numbered row by a defined length (for example, Px/2). This is also the same for the dummy pixel electrodes 131.

Figure 26:
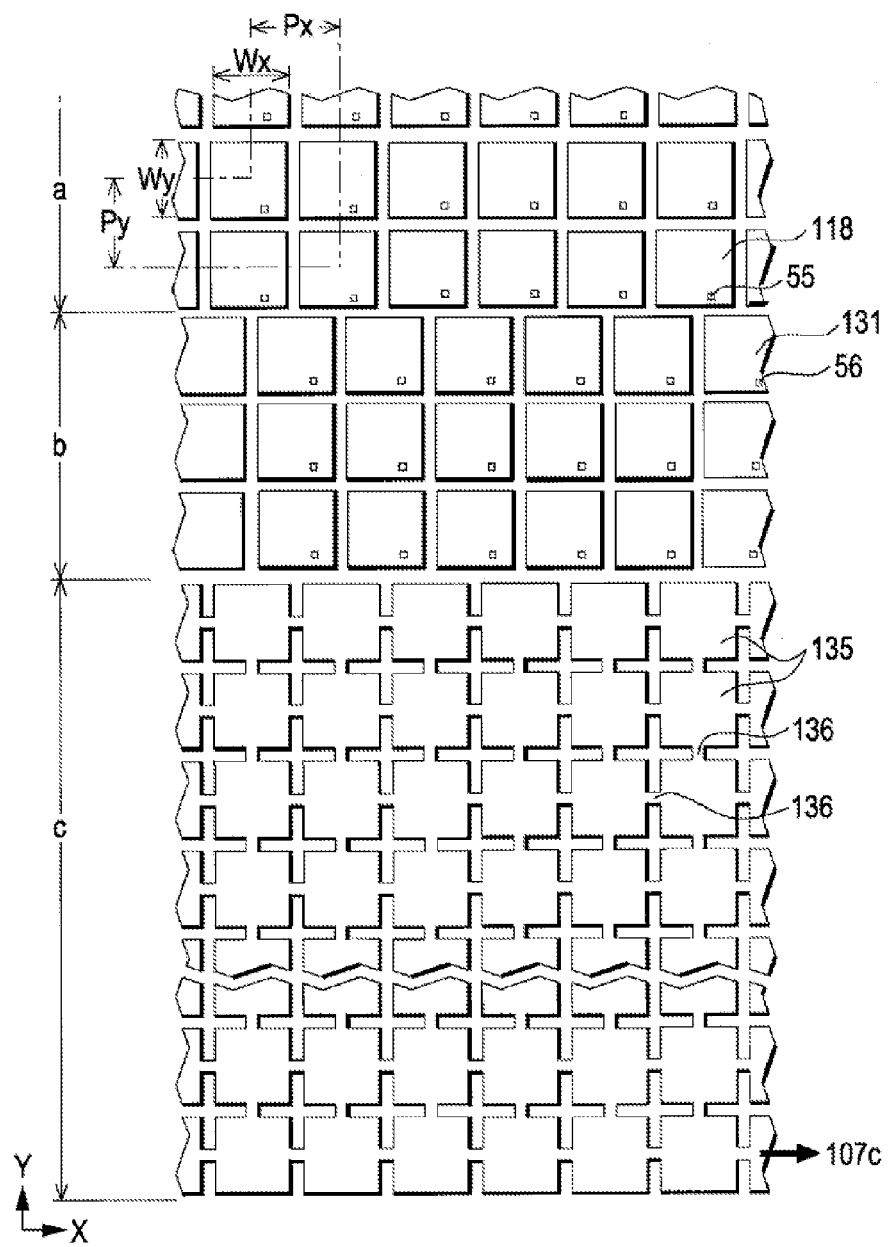
FIG. 26 is a diagram illustrating still another example of the electrode configuration in the K region.

FIG. 26 is a diagram ill still another example of the electrode configuration in the K region. In FIG. 26, the pixel electrodes 118 in the display region a and the dummy pixel electrodes 131 in the dummy display region b are arranged to be misaligned with each other in their x coordinates. When only the pixel electrodes 118 in the display region a are seen, the x coordinates are aligned, and when only the dummy pixel electrodes 131 in the dummy display region b are seen, the x coordinates are aligned. However, the x coordinate for the reference point (for example, the bottom-left vertex) of the dummy pixel electrode 131 is misaligned with that for the reference point (for example, the bottom-left vertex) of the pixel electrode 118 by a defined length (for example, Px/2).

Figure 27:
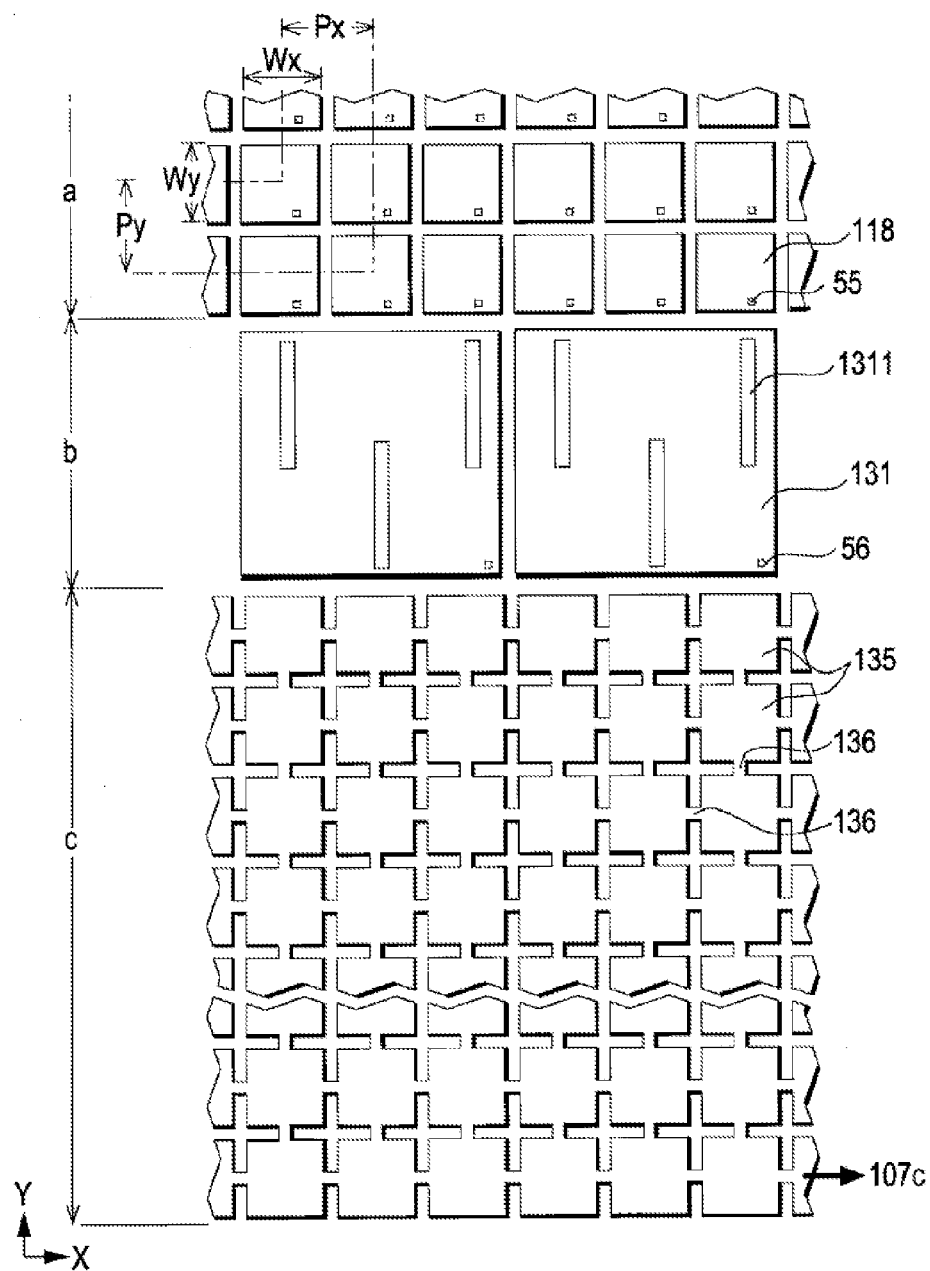
FIG. 27 is a diagram illustrating still another example of the electrode configuration in the K region.

FIG. 27 is a diagram illustrating still another example of the electrode configuration in the K region. In the example shown in FIG. 10, the pixel electrode 118 and the dummy pixel electrode 131 have the same shape and size. However, in the example shown in FIG. 27, the pixel electrode 118 and the dummy pixel electrode 131 have different sizes and pitches. Specifically, the pitch of the dummy pixel electrodes 131 is greater than that of the pixel electrodes 118. However, in the example shown in FIG. 27, the dummy pixel electrode 131 has slits 1311. The slits 1311 are designed to give such a shape that the display region a and the dummy display region b have the same wiring density. For example, in a case where opening portions of 10% are present between the pixel electrodes 118 in the display region a, a total of opening portions of 10% are formed by opening portions between the electrodes and the slits 1311 in the dummy display region b. In all the examples shown in FIGS. 10 and 25 to 27, the pixel electrodes 118 and the dummy pixel electrodes 131 are configured such that the display region a and the dummy display region b have the same wiring density.

Electronic Equipment

Figure 24:
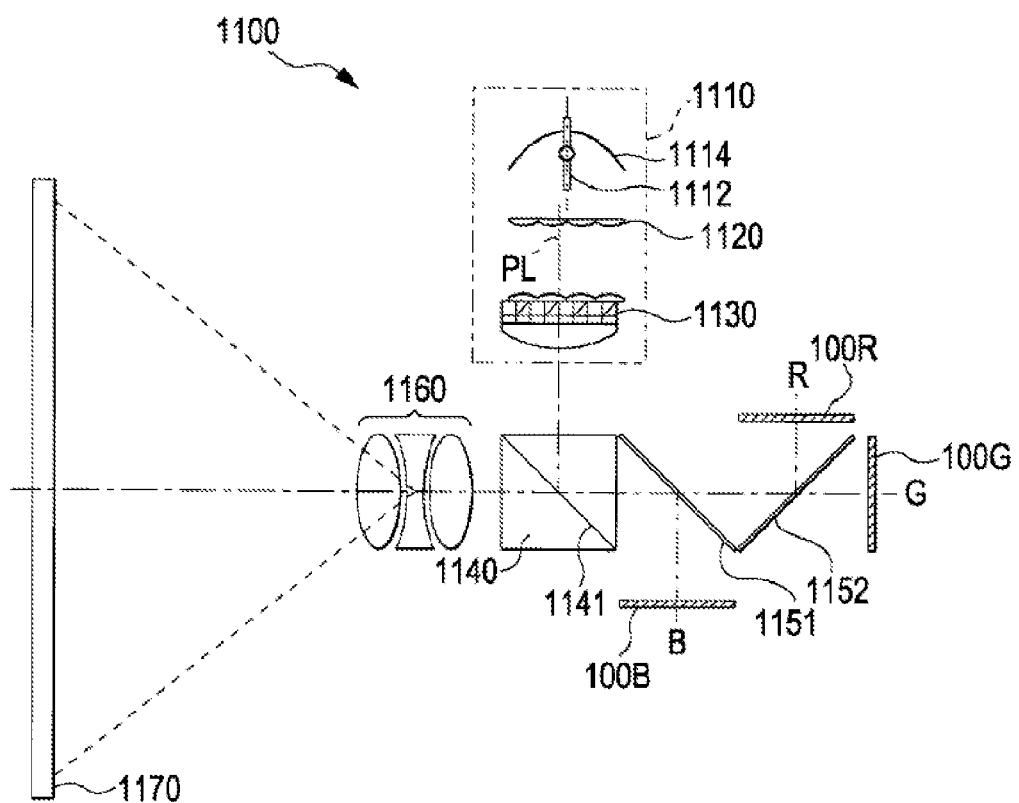
FIG. 24 is a diagram illustrating a configuration of a projector to which the liquid crystal panel is applied.

Next, electronic equipment to which the reflective liquid crystal panel 100 according to the above-described embodiments is applied will be described. FIG. 24 is a plan view illustrating a configuration of a projector 1100 using the liquid crystal panel 100 as a light valve.

As shown in the figure, the projector 1100 is of a three-plate type where the reflective liquid crystal panel 100 according to the embodiments corresponds to each color of R (red), G (green), B (blue). A polarization illumination device 1110 is disposed along a system optical axis PL inside the projector 1100. In the polarization illumination device 1110, light beams emitted from a lamp 1112 become substantially parallel light beams through reflection by a reflection mirror 1114 and enter a first integrator lens 1120. The light beams emitted from the lamp 1112 are divided into a plurality of intermediate light beams by the first integrator lens 1120. The divided intermediate light beams are converted into one kind of polarized light beams (s-polarized light beams) of which the polarization directions are almost aligned by a polarization conversion element 1130 which has a second integrator lens at a light incident side, and are emitted from the polarization illumination device 1110.

Here, the s-polarized light beams emitted from the polarization illumination device 1110 are reflected by an s-polarized light beam reflection surface of a polarized beam splitter 1140. Among the reflected light beams, the light beams of blue (B) are reflected by a blue light reflection layer of a dichroic mirror 1151 and are modulated by a liquid crystal panel 100B. In addition, among the light beams passing through the blue light reflection layer of the dichroic mirror 1151, the light beams of red (R) are reflected by a red light reflection layer of a dichroic mirror 1152, and are modulated by a liquid crystal panel 100R. On the other hand, among the light beams passing through the blue light reflection layer of the dichroic mirror 1151, the light beams of green (G) pass through the red light reflection layer of the dichroic mirror 1152, and are modulated by a liquid crystal panel 100G.

Here, the liquid crystal panel 100R, the liquid crystal panel 100G, and the liquid crystal panel 100B are the same as the liquid crystal panel 100 according to the above-described embodiments, and are respectively driven by data signals supplied corresponding to the respective colors of R, G and B. In other words, in the projector 1100, three liquid crystal panels 100 are provided so as to correspond to the respective colors of R, G and B, and are respectively driven according to image signals corresponding to the respective colors of R, G and B.

The red, green and blue light beams which are respectively modulated by the liquid crystal panel 100R, the liquid crystal panel 100G, and the liquid crystal panel 100B are sequentially synthesized by the dichroic mirrors 1152 and 1151, and the polarized beams splitter 1140, and then are projected onto a screen 1170 by a projection optical system 1160. In addition, the light beams corresponding to the respective primary colors of R, G and B are incident to the liquid crystal panels 100R, 100G and 100B by the dichroic mirrors 1151 and 1152, and thus color filters are not necessary.

In addition, as the electronic equipment, in addition to the projector described with reference to FIG. 24, there are the EVF described above, a rear projection type television, a head mount display, and the like.

This application claims priority from Japanese Patent Applications No. 2010-238320 filed in the Japanese Patent Office on Oct. 25, 2010 and No. 2011-114701 filed in the Japanese Patent Office on May 23, 2011, the entire disclosure of which is hereby incorporated by reference in its entirely.

What is claimed is:

1. An electro-optical device comprising:
an element substrate; and
an opposite substrate disposed to face the element substrate,
wherein the element substrate includes
a plurality of scan lines;
a plurality of data lines intersecting the plurality of scan lines in a plan view;
a plurality of pixel electrodes formed at a side facing the opposite substrate and arranged with a predetermined pitch for each pixel, each of the pixel electrodes being provided at each of the intersections of the plurality of scan lines and the plurality of data lines;
a plurality of capacitors each corresponding to one of the plurality of pixel electrodes and having a capacitance electrode formed from the same electrode layer as the data line;
a shield electrode provided between the data line and the pixel electrode in a cross-sectional view, formed to cover the data line in the plan view, and electrically connected to the capacitance electrode formed from the same electrode layer as the data line;
a driving circuit that is located between the plurality of pixel electrodes and a edge of the element substrate in the plan view and drives the plurality of pixels;
a plurality of dummy pixel electrodes provided between the plurality of pixel electrodes and the edge of the element substrate, formed from the same layer as the plurality of pixel electrodes, and arranged so as to have substantially the same density as the plurality of pixel electrodes in the plan view; and
a wire disposed on a layer different from the plurality of pixel electrodes and electrically connecting the plurality of dummy pixel electrodes, which are adjacent to each other in at least one direction among the plurality of dummy pixel electrodes, to each other, and
the wire being formed from the same electrode layer as the shield electrode,
the shield electrode extending along to a first direction,
the wire extending along to the first direction,
the shield electrode being apart from the wire.

2. The electro-optical device according to claim 1, wherein
the shield electrode is applied with a predetermined voltage, and
the wire is formed from the same layer as the shield electrode and is applied with the predetermined voltage.

3. The electro-optical device according to claim 2, wherein a common electrode of the opposite substrate is applied with a predetermined common voltage, and
wherein the predetermined voltage is the common voltage.

4. The electro-optical device according to claim 1,
wherein the driving circuit includes
two scan line driving circuits respectively driving each of the plurality of scan lines from both end sides of the plurality of scan lines; and
a data line driving circuit driving each of the plurality of data lines from one end side of the plurality of data lines.

5. The electro-optical device according to claim 4, wherein the wire is a first wire formed from an electrode layer different from the data line, and
wherein the dummy pixel electrodes located between the data line driving circuit and the plurality of pixel electrodes among the plurality of dummy pixel electrodes are connected to each other via the first wire.

6. The electro-optical device according to claim 4, wherein a voltage higher than the common voltage by a predetermined value and a voltage lower than the common voltage by the predetermined value are alternately applied to the dummy pixel electrode at a predetermined period.

7. The electro-optical device according to claim 1, wherein an insulating material is buried in a gap between the pixel electrodes and a gap between the dummy pixel electrodes in the plan view.

8. The electro-optical device according to claim 1, further comprising a conductive pattern provided at a position surrounding the dummy pixel electrode in the plan view, formed from the same layer as the pixel electrode, and not connected to the dummy pixel electrode.

9. The electro-optical device according to claim 1, wherein the dummy pixel electrodes are arranged so as to have substantially the same size and pitch as the pixel electrodes in the plan view.

10. Electronic equipment comprising the electro-optical device according to claim 1.

11. The electro-optical device according to claim 1, the shield electrode being electrically connected to the wire.

12. An electro-optical device comprising:
an element substrate; and
an opposite substrate facing to the element substrate,
the element substrate including:
a plurality of pixel electrodes;
a plurality of dummy pixel electrodes disposed between the plurality of pixel electrodes and an edge of the element substrate;
a first shield electrode disposed between a first data line and one of the plurality of pixel electrodes; and
a second shield electrode disposed between a second data line and one of the plurality of dummy pixel electrodes,
a first dummy pixel electrode among the plurality of dummy pixel electrodes and a second dummy pixel electrode among the plurality of dummy pixel electrodes being electrically connected via the second shield electrode,
the first shield electrode extending along to a first direction,
the second shield electrode extending along to the first direction,
the first shield electrode being apart from the second shield electrode.

13. The electro-optical device according to claim 12, the first shield electrode being electrically connected to the second shield electrode.

14. An element substrate of an electro-optical device comprising:
a plurality of pixel electrodes;
a plurality of dummy pixel electrodes disposed between the plurality of pixel electrodes and an edge of the element substrate;
a first shield electrode disposed between a first data line and one of the plurality of pixel electrodes; and
a second shield electrode disposed between a second data line and one of the plurality of dummy pixel electrodes,
a first dummy pixel electrode among the plurality of dummy pixel electrodes and a second dummy pixel electrode among the plurality of dummy pixel electrodes being electrically connected via the second shield electrode,
the first shield electrode extending along to a first direction,
the second shield electrode extending along to the first direction,
the first shield electrode being apart from the second shield electrode.

15. The element substrate of an electro-optical device according to claim 14, the first shield electrode being electrically connected to the second shield electrode.

* * * * *